(12) United States Patent
Stoeffler et al.

(10) Patent No.: US 9,378,431 B2
(45) Date of Patent: Jun. 28, 2016

(54) METHOD OF MATCHING IMAGE FEATURES WITH REFERENCE FEATURES AND INTEGRATED CIRCUIT THEREFOR

(75) Inventors: Norbert Stoeffler, Graefelfing (DE); Peter Meier, Munich (DE)

(73) Assignee: Metaio GmbH, Munich (DE)

( * ) Notice: Subject to any disclaimer, the term of this patent is extended or adjusted under 35 U.S.C. 154(b) by 110 days.

(21) Appl. No.: 14/359,029

(22) PCT Filed: Nov. 18, 2011

(86) PCT No.: PCT/EP2011/070489
§ 371 (c)(1),
(2), (4) Date: Jul. 22, 2014

(87) PCT Pub. No.: WO2013/071981
PCT Pub. Date: May 23, 2013

(65) Prior Publication Data
US 2015/0049955 A1 Feb. 19, 2015

(51) Int. Cl.
*G06K 9/46* (2006.01)
*G06K 9/66* (2006.01)
(Continued)

(52) U.S. Cl.
CPC ........ *G06K 9/6215* (2013.01); *G06F 17/30244* (2013.01); *G06F 17/30256* (2013.01); *G06K 9/00986* (2013.01); *G06K 9/46* (2013.01); *G06K 9/4671* (2013.01); *G06K 9/6202* (2013.01); *G02B 27/0101* (2013.01); *G06T 7/004* (2013.01); *H04N 5/23241* (2013.01)

(58) Field of Classification Search
CPC ............. G06K 9/6215; G06K 9/00986; G02B 2027/0138; G02B 27/0101; H04N 5/23241
USPC .................................................. 382/190, 220
See application file for complete search history.

(56) References Cited

U.S. PATENT DOCUMENTS

| 7,382,897 B2 * | 6/2008 | Brown .................. G06K 9/4609 358/450 |
| 7,768,534 B2 | 8/2010 | Pentenrieder et al. |

(Continued)

OTHER PUBLICATIONS

Lowe, David G. "Distinctive Image Features from Scale-Invariant Keypoints." International Journal of Computer Vision 60.2 (2004) : 91-110.

(Continued)

*Primary Examiner* — Kanjibhai Patel
(74) *Attorney, Agent, or Firm* — Blank Rome LLP

(57) ABSTRACT

The invention is related to a method of matching image features with reference features, comprising the steps of providing a current image captured by a capturing device, providing reference features (r), wherein each of the reference features comprises at least one reference feature descriptor (d(r)), determining current features (c) in the current image and associating with each of the current features at least one respective current feature descriptor (d(c)), and matching the current features with at least some of the reference features by determining a respective similarity measure (D(c, r)) between each respective current feature descriptor (d(c)) and each respective reference feature descriptor (d(r)). According to the invention, the determination of the similarity measure is performed on an integrated circuit by hardwired logic or configurable logic which processes logical functions for determining the similarity measure. The invention is also concerned with an integrated circuit for matching of image features with reference features.

30 Claims, 10 Drawing Sheets

(51) Int. Cl.
G06K 9/62 (2006.01)
G06F 17/30 (2006.01)
G06K 9/00 (2006.01)
G06T 7/00 (2006.01)
H04N 5/232 (2006.01)
G02B 27/01 (2006.01)

(56) References Cited

U.S. PATENT DOCUMENTS 7,961,982 B2 * 6/2011 Sibiryakov ........... G06K 9/6211
382/107
8,687,891 B2 * 4/2014 Takacs ................. G06K 9/4642
382/190

OTHER PUBLICATIONS

Kumar, Ankita et al. "Experiments on visual loop closing using vocabulary trees." 2008 IEEE Computer Society Conference on Computer Vision and Pattern Recognition Workshops 0 (2008) : 1-8.
Bleser, Gabriele, and Didier Stricker. "Advanced tracking through efficient image processing and visual—inertial sensor fusion." Computers & Graphics 331 (2009) : 59-72.
Chen, David M et al. "City-scale landmark identification on mobile devices". 2011 IEEE Computer Society Conference on Computer Vision and Pattern Recognition (2011).
Reitmayr, G. and T. W. Drummond. "Initialisation for Visual Tracking in Urban Environments." 2007 6th IEEE and ACM International Symposium on Mixed and Augmented Reality (2007) : 1-9.
Bonato, Vanderlei, Eduardo Marques, and George A Constantinides. "A Parallel Hardware Architecture for Scale and Rotation Invariant Feature Detection." IEEE Transactions on Circuits and Systems for Video Technology 18.12 (2008) : 1703-1712.
Schall, Gerhard et al. "Global pose estimation using multi-sensor fusion for outdoor Augmented Reality." 2009 8th IEEE International Symposium on Mixed and Augmented Reality (2009) : 153-162.
Arth, Clemens et al. "Wide area localization on mobile phones." 2009 8th IEEE International Symposium on Mixed and Augmented Reality (2009) : 73-82.
Fischler, M. A. and Bolles, R. C.. "Random Sample Consensus: A Paradigm for Model Fitting with Applications to Image Analysis and Automated Cartography." 1981 Communications of the ACM 24 (1981): 381-395.
Chum, O. and Matas, J."Matching with PROSAC—progressive sample consensus." 2005 Proceedings of IEEE Conference on Computer Vision and Pattern Recognition (2005): 220-226.
Hinterstoisser, Stefan et al. "N3M: Natural 3D Markers for Real-Time Object Detection and Pose Estimation," 2007 IEEE 11th International Conference on Computer Vision (2007): 1-7.
Yao, Lifan et al. "An architecture of optimised SIFT feature detection for an FPGA implementation of an image matcher." 2009 International Conference on FieldProgrammable Technology (2009) : 30-37.

Zhang, Jing et al. "Overview of approaches for accelerating scale invariant feature detection algorithm." 2011 International Conference on Electric Information and Control Engineering (2011) : 585-589.
Taati, Babak: "Generation and Optimization of Local Shape Descriptors for Point Matching in 3-D Surfaces." Thesis (Ph.D, Electrical & Computer Engineering)—Queen's University, Kingston, Ontario, Canada, Aug. 2009.
Wagner, Daniel et al. "Pose tracking from natural features on mobile phones." 2008 7th IEEEACM International Symposium on Mixed and Augmented Reality (2008) : 125-134.
Smith, Ross, Wayne Piekarski, and Grant Wigley. "Hand Tracking for Low Powered Mobile AR User Interfaces." Proceedings of the Sixth Australasian conference on User interfacevol. 40 (1999) : 7-16.
Bosch, A, Andrew Zisserman, and X Munoz. "Representing shape with a spatial pyramid kernel." Image Processing 5 (2007) : 401-408.
Wu, Changchang et al. "3D model matching with Viewpoint-Invariant Patches (VIP)." IEEE Conference on Computer Vision and Pattern Recognition (2008) 0 (2008) : 1-8.
Uchiyama, Hideaki, and Marchand, Eric. "Toward Augmenting Everything: Detecting and Tracking Geometrical Features on Planar Objects." 2011 International Symposium on Mixed and Augmented Reality (2011):17-25.
Mikolajczyk, K. and Schmid, C. „A Performance Evaluation of Local Descriptors. 2005 IEEE Trans. Pattern Anal. Mach. Intell. 27, 10 (2005): 1615-1630.
Saad Rehman et al. "An FPGA Based Generic Framework for High Speed Sum of Absolute Difference Implementation", European Journal of Scientific Research, vol. 33, No. 1, Jan. 1, 2009, pp. 6-29.
Lu Xia et al. "Human Detection Using Depth Information by Kinect", Computer Vision and Pattern Recognition Workshops (CVPRW), 2011 IEEE Computer Scoeity Conference, Jun. 20, 2011, pp. 15-22.
Pereda et al. "Parallel Computation of Similarity Measures Using an FPGA-Based Processor Array", Advanced Information Networking and Applications, Mar. 25, 2008, pp. 955-962.
Cao Wei et al. "A Novel SAD Computing Hardware Architecture for Variable-Size Block Motion Estimation and its Implementation with FPGA", AISC, 2008, Proceedings. 5th International Conference on Oct. 21-24, 2003, vol. 2, Oct. 21, 2003, pp. 950-953.
Kristian Ambrosch et al. "Hardware Implementation of an SAD Based Stereo Vision Algorithm", 2007 IEEE Conference on Computer Vision and Pattern Recognition, Jun. 1, 2007, pp. 1-6.
Wong et al. "A Sum of Absolute Differences Implementation in FPGA Hardware", Euromicro Conference, Sep. 4-6, 2002, pp. 183-188.
Cornelis et al. "Fast Scale Invariant Feature Detection and Matching on Programmable Graphics Hardware," Computer Vision and Pattern Recognition Workshops, Jun. 23, 2008, pp. 1-8.
Herbert Bay et al. "Speeded-up Robust Features (SURF)", Computer Vision and Image Understanding, vol. 110, No. 3, Jun. 1, 2008, pp. 346-359.

* cited by examiner

Fig. 2: Detection, description and matching of features

Fig. 3: Overall process/system + state of art

Fig. 8 Performance of vocabulary tree vs. best bin first

Fig. 9: Example application of real scale features

METHOD OF MATCHING IMAGE FEATURES WITH REFERENCE FEATURES AND INTEGRATED CIRCUIT THEREFOR

This application is entitled to the benefit of, and incorporates by reference essential subject matter disclosed in PCT Application No. PCT/EP2011/070489 filed on Nov. 18, 2011.

BACKGROUND OF THE INVENTION

1. Technical Field

The invention is related to a method of matching image features with reference features, comprising the steps of providing a current image captured by a capturing device, providing reference features, wherein each of the reference features comprises at least one reference feature descriptor, determining current features in the current image and associating with each of the current features at least one respective current feature descriptor, and matching the current features with the reference features by determining a respective similarity measure between each respective current feature descriptor and each respective reference feature descriptor. The invention is also concerned with an integrated circuit for matching of image features with reference features.

2. Background Information

Standard Approaches, Limitations and Existing Solutions:

Many tasks in processing of images taken by a camera, such as in augmented reality applications and computer vision require finding points or features in multiple images of the same object or scene that correspond to the same physical 3D surface. For example, in augmented reality, the main problem is to determine the position and orientation of the camera with respect to the world (camera pose).

The standard approach to initialization of an optical tracking (i.e. when no knowledge from a previous frame is available) can be divided into three main building blocks: feature detection, feature description and feature matching (see FIG. 1). As the skilled person will understand, if no knowledge from a previous frame is available, that does not mean that no knowledge from non-optical sensors, like GPS or compass is allowed. Feature detection is also referred to as feature extraction.

At first, feature detection is performed for identifying features in an image by means of a method that has a high repeatability. In other words, the probability is high that the method will chose the part in an image corresponding to the same physical 3D surface as a feature for different viewpoints, different rotations and/or illumination settings (e.g. local feature descriptors as SIFT [1], shape descriptors [18] or other approaches known to the skilled person). Features are usually extracted in scale space, i.e. at different scales. Therefore, each feature has a repeatable scale in addition to its two-dimensional position. In addition, a repeatable orientation (rotation) is computed from the intensities of the pixels in a region around the feature, e.g. as the dominant direction of intensity gradients.

Next, a feature descriptor is determined in order to enable the comparison and matching of features. Common approaches use the computed scale and orientation of the feature to transform the coordinates of the feature descriptor, which provides invariance to rotation and scale. For instance, the descriptor may be an n-dimensional real-numbered vector, which is constructed by concatenating histograms of functions of local image intensities, such as gradients (as in Lowe, David G. "Distinctive Image Features from Scale-Invariant Keypoints." *International Journal of Computer Vision* 60.2 (2004): 91-110. ("Lowe")).

Finally, an important task is the feature matching Given a current feature detected in and described from a current intensity image, the goal is to find a feature that corresponds to the same physical 3D surface in a set of provided features that will be referred to as reference features. The simplest approach to feature matching is to find the nearest neighbor of the current feature's descriptor by means of exhaustive search and choose the corresponding reference feature as match. More advanced approaches employ spatial data structures in the descriptor domain to speed up matching. Unfortunately, there is no known method that would enable nearest neighbor search in high-dimensional spaces, which is significantly faster than exhaustive search. That is why common approaches use approximate nearest neighbor search instead, e.g. enabled by space partitioning data structures such as kd-trees (see, Lowe).

FIG. 1 (in connection with FIG. 2) shows a flow chart of a standard method to match a set of current features with a set of reference features. In step S11, a current image CI is provided taken with a capturing device. The next step S12 then detects and describes features in the current image CI (optional: already selective extraction according to estimated model-feature-positions), where every resulting current feature c has a feature descriptor d(c) and a 2D position in the camera image cI. Possible methods that could be used for feature detection and description are explained in more detail below referring to exemplary implementations. A set of reference features r, each with a descriptor d(r) and a (partial) position and/or orientation in a global coordinate system is provided in step S13. The reference features can be extracted from reference images or 3D models or other information about the object. Please note, that the position and/or orientation in a global coordinate system is optional in case of visual search and classification tasks. In step S14, the current features c from step S12 and the reference features r from step S13 are matched. For example, for every current feature the reference feature is searched that has the closest descriptor to the descriptor of the current feature with respect to a certain distance measure. According to step S15, an application uses the feature matches, e.g. in order to estimate the position and orientation of the capturing device very accurately in an augmented reality application that integrates spatially registered virtual 3D objects into the camera image.

Limitations of the Standard Approaches:

Flexibility is important in order to initialize tracking successfully in different environments. The features described in Lowe, for example, work very well in textured environments. In environments with little texture or in cases the texture changes (e.g. the appearance of a car finish changes strongly depending on its environment and the camera position), features as in Lowe have major difficulties. Features as described in Bosch, A, Andrew Zisserman, and X Munoz. "Representing shape with a spatial pyramid kernel" *Image Processing* 5 (2007): 401-408 ("Bosch") work better in non-textured environments. Therefore, feature detection and feature description algorithms are frequently adapted and changed in order to better suit a specific task.

With a growing number of reference features, the time to match a single current feature increases, making real-time processing impossible at some point due to limitations on the hardware. Also, the distinctiveness of feature descriptors decreases with a growing number of reference features, which in turn is limiting the matching quality and significantly affects the robustness.

Already Proposed Solutions:

Different approaches exist that are based on a set of georeferenced local image features acting as reference features. The assumption of these approaches is that if the position of the capturing device is approximately known, only those reference features are possibly visible that are located in the vicinity of the capturing device. In other words, the methods aim to reduce the number of potential matches among the reference features. For example, methods were proposed that use sensor data, e.g. GPS positioning to narrow down the search area and a set of pre-built vocabulary trees for every spatial region to find the best matching image in this search region (see, Kumar, Ankita et al. "Experiments on visual loop closing using vocabulary trees." 2008 *IEEE Computer Society Conference on Computer Vision and Pattern Recognition Workshops* 0 (2008): 1-8 ("Kumar"); Chen, David M et al. "City-scale landmark identification on mobile devices". 2011 *IEEE Computer Society Conference on Computer Vision and Pattern Recognition* (2011) ("Chen").

In addition, better results where achieved when using a single global vocabulary tree and incorporating the GPS position as a prior in the feature match scoring process (see, Chen). The method of Reitmayr, G. and T. W. Drummond. "Initialisation for Visual Tracking in Urban Environments." 2007 *6th IEEE and ACM International Symposium on Mixed and Augmented Reality* (2007): 1-9 ("Reitmayr") uses GPS to gain a coarse position of the device for the initialization of a visual tracking in an outdoor augmented reality system. Given this position, initialization with a constrained camera position at a number of position samples around the rough GPS measurement is performed until initialization succeeds. In another approach, the combination of a differential GPS/IMU hardware module with barometric height measurements in a Kalman filter is used in order to improve the accuracy of the device's 3D position estimate (see, Schall, Gerhard et al. "Global pose estimation using multi-sensor fusion for outdoor Augmented Reality." 2009 *8th IEEE International Symposium on Mixed and Augmented Reality* (2009): 153-162 ("Schall"). The method of Arth, Clemens et al. "Wide area localization on mobile phones" 2009 *8th IEEE International Symposium on Mixed and Augmented Reality* (2009): 73-82 ("Arth") uses potentially visible sets (PVS) and thereby not only consider spatial vicinity of features but also visibility constraints. Coarse positioning with GPS is mentioned for retrieval of PVS in an outdoor application.

The visual inertial tracking method of Bleser, Gabriele, and Didier Stricker. "Advanced tracking through efficient image processing and visual-inertial sensor fusion." *Computers & Graphics* 33.1 (2009): 59-72 ("Bleser") applies inertial sensors to measure the relative movement of the camera from the prior frame to the current frame. This knowledge is used for predicting the position and defining a 2D search space in the image space for features that are tracked from frame to frame. Since the technique uses measurements of relative camera transformations only, it is not suited for the initialization of camera pose tracking or visual search tasks.

None of the above mentioned methods suggests increasing speed and performance by accelerating the vision algorithms on hardware.

Typical approaches considering hardware acceleration of vision algorithms optimize feature detection and feature description, whereas the feature matching remains implemented in software. For example, in Yao, Lifan et al. "An architecture of optimised SIFT feature detection for an FPGA implementation of an image matcher." 2009 *International Conference on FieldProgrammable Technology* (2009): 30-37 ("Yao") the matching stays in software, while the feature detection and description are optimized on hardware: "It can be seen from Section II that the optimised SIFT algorithm for an image matcher consists of five stages: 1) Gaussian pyramid construction. 2) DoG space construction and feature identification. 3) Gradient and orientation histogram generation. 4) Feature descriptor generation. 5) Image matching Considering the nature of Xilinx FPGA embedded system, a top level system partition which is similar to Bonato, Vanderlei, Eduardo Marques, and George A Constantinides. "A Parallel Hardware Architecture for Scale and Rotation Invariant Feature Detection" *IEEE Transactions on Circuits and Systems for Video Technology* 18.12 (2008): 1703-1712 ("Bonato") has been adopted for the FPGA implementation. More specifically, the first three stages are implemented as a hardware core named as SIFT feature detection module, whereas the last two stages are considered to be implemented as a software module named as SIFT feature generation and image matching module using Xilinx MicroBlaze software processor". Same applies to Zhang, Jing et al. "Overview of approaches for accelerating scale invariant feature detection algorithm." 2011 *International Conference on Electric Information and Control Engineering* (2011): 585-589 ("Zhang"). Please note that Bonato talks about the problem of high matching processing time (referred to as association) but does not propose to build a specific hardware block to solve this. Instead, they propose to accelerate their software solution by running it on faster general purpose processors.

Another example of accelerating the image processing by means of hardware acceleration is disclosed in Smith, Ross, Wayne Piekarski, and Grant Wigley. "Hand Tracking For Low Powered Mobile AR User Interfaces" *Proceedings of the Sixth Australasian conference on User interface Volume 40* (1999): 7-16 ("Smith"). The authors discuss that not all of the many vision tracking algorithms may be easily implemented on an FPGA. They limit themselves explicitly to techniques that do not require complex floating point calculations in an effort to minimize the area used on the FPGA. They chose to accelerate image processing: "There are many different vision tracking algorithms but not all of them can be easily implemented on an FPGA. We have avoided using techniques that require complex floating point calculations in an effort to minimize the area used on the FPGA. We found that segmentation could be performed using very few gates."

Therefore, it would be beneficial to provide a method which enables a higher performance and higher algorithmic flexibility at reduced processing and power requirements while performing visual computing tasks. Particularly, the method should not only enable a faster matching process but also improve matching quality by taking advantage of additional hints.

SUMMARY OF THE INVENTION

According to an aspect of the invention, a method of matching image features with reference features comprises the following steps: providing a current image captured by a capturing device, providing reference features, wherein each of the reference features comprises at least one reference feature descriptor, determining current features in the current image and associating with each of the current features at least one respective current feature descriptor, and matching the current features with at least some of the reference features by determining a respective similarity measure between each respective current feature descriptor and each respective reference feature descriptor, the determination of the similarity measure being performed on an integrated circuit by hardwired logic or configurable logic which processes logical functions for determining the similarity measure.

According to the present invention, a new approach is proposed on how visual computing tasks can be optimized and run more robust in real time by implementing dedicated parts in hardware. The selection of the most useful building block and the adaption of the software to take advantage of the optimization are not only new, but highly innovative, enabling a higher performance at reduced processing and power requirements. On the other hand, most of the above described approaches using hardware acceleration go for the feature extraction and feature descriptor building which drastically decreases the system's flexibility concerning the features used. At the same time they do not accelerate the matching process on a descriptor level. Furthermore, due to flexibility requirements as described above (textured, non-textured environments, etc.), algorithms for feature detection and feature description are still frequently adopted and changed and show a broad variety.

A further effect of the invention is to improve the initialization of an optical tracking system based on pre-learned data (reference features) in order to enable a higher performance at reduced processing and power requirements.

According to another aspect of the invention, there is provided an integrated circuit for matching of image features with reference features, comprising an interface for receiving a number of current feature descriptors of respective current features taken from a current image captured by a capturing device, an interface for receiving a number of reference feature descriptors of respective reference features, and a logic circuit for determining a respective similarity measure between each respective current feature descriptor and each respective reference feature descriptor for matching the current features with the reference features, wherein the logic circuit comprises hardwired logic or configurable logic which processes logical functions for determining the similarity measure.

In a preferred embodiment, our method is implemented on a specialized hardware block and not executed by a general purpose processor. The hardware block can of course be part of the same integrated circuit (also referred to as silicon or chip) as the general purpose processor.

In a preferred embodiment, the specialized hardware block is a non-programmable unit, wherein programmable refers to executing a dynamic sequence of general purpose instructions.

In a preferred embodiment the current image can be an intensity image or a depth image.

When we speak of intensity images throughout this disclosure, we refer to images representing different amounts of light reflected from the environment, mostly depending on the environment's material and the light situation. Intensity images can encode intensity in one (e.g. greyscale) or more than one channels (e.g. RGB—red-green-blue) in different bit resolutions (e.g. 8 bit or high dynamic range).

There are several methods possible to provide a depth image or sparse depth information comprising the depth of an element, e.g. a pixel or a feature, in an image which may be used in a matching process according to the present invention which will be described in the following paragraphs.

According to an embodiment to determine a depth of at least one element in an intensity image, at least two capturing devices with known relative position and/or orientation each capture a respective intensity image, wherein correspondences are found in the images and the relative position and/or orientation of the capturing devices is used to calculate a depth of at least one element in the intensity images which is part of at least one of the correspondences. In this case the matching process would be conducted in two general steps. First matching features of current frame one and current frame two in order to calculate their depth information from a given pose between capturing device one and two. In a later step, the current features are then matched against reference features, taking advantage of the depth information or derived positional information during the matching process.

According to another embodiment to determine a depth of at least one element in an intensity image, at least one capturing device captures intensity images at different points of time from different positions, wherein correspondences are found in the different images and a relative position and/or orientation of the capturing device between the different images and a structure of the correspondences are recovered and used to calculate a depth of at least one element in the intensity images which is part of at least one of the correspondences. As in the case above, the matching could again be conducted in several processes, matching recent image features with each other and then incorporating the additional information in a matching process against older reference features.

According to another embodiment to determine a depth of at least one element in an intensity image, there is provided at least one database of intensity images, wherein for each of the intensity images an overall depth, or depth for at least one image region, or depth for one or more pixels is known and the intensity image captured by the capturing device (current intensity image) is matched against this database. The matching result is used to calculate a depth of at least one element in the current intensity image.

According to another embodiment to determine a depth of at least one element in an intensity image, there is provided an environment model and information about a position and/or orientation of the capturing device when capturing the intensity image with respect to the environment model (which may be an initial estimation), wherein the environment model and the information about the position and/or orientation of the capturing device are combined and used to calculate a depth or a position estimate of at least one element in the intensity image.

According to another embodiment to determine a depth of at least one element in an intensity image, there is provided at least one sensor for retrieving depth information or range data and at least a relative position and/or orientation of the at least one sensor with respect to the capturing device, wherein the depth information or range data is used to calculate a depth of at least one element in the intensity image. Preferably, the pose (position and orientation) and intrinsic parameters of, both, the sensor and the capturing device are known.

Of course, this process can also be implemented in an iterative fashion, where initial position estimates are used to match against reference features and calculating a first pose, using the first pose in order to refine the current features position and starting another matching process.

According to an embodiment, the reference features are extracted from at least one reference image which has been recorded with a second capturing device different from the capturing device. According to an embodiment, the capture time of the at least one reference image is at least one day older than the capture time of the current image.

As a similarity measure according to the present invention, for example, a distance measure may be used. According to an embodiment, the method of the invention may include determining at least one respective check parameter by comparing the distance measure with at least one respective threshold, wherein the check parameter is used as a criteria to determine whether the matching is performed or to influence the distance measure. If the matching is performed, the respective determined similarity measure is used in the matching process.

According to an embodiment of the invention, calculations for determining the respective distance measure, or parts thereof, and a respective check parameter (as explained in more detail below) are performed in parallel in a pipelined manner on the integrated circuit. For example, one respective distance measure and/or check parameter is calculated per clock cycle of a clock signal of the integrated circuit.

In an aspect of the invention, after determining a respective similarity measure, the method further comprises storing a most similar and a second most similar similarity measure from the similarity measures determined until then, and an index of the respective current feature descriptor associated with the most similar similarity measure.

According to an embodiment, the most similar similarity measure is compared with a derivative of the second most similar similarity measure, wherein if this comparison fulfills a predetermined condition, the most similar and second most similar similarity measure, the index, and the associated reference feature descriptor are provided for further processing.

The method may further comprise determining from the computed distance measures a lowest distance measure and storing an index of the respective current feature descriptor for which the lowest distance measure has been determined.

According to an aspect, the method may further include storing the current feature descriptors on a memory (such as SRAM) of the integrated circuit which are retrieved from the memory without wait states.

According to an embodiment, the method further comprises the steps of associating with each of the current features at least one current feature descriptor vector, wherein each of the reference features comprises at least one reference feature descriptor vector, and computing a respective similarity measure between each of the reference feature descriptor vectors of the reference features and each of the current feature descriptor vectors of the current features.

In a possible implementation, at least a pixel of the current image is set as a respective current feature in the current image, i.e. every pixel of an image may represent a feature.

According to an embodiment of the invention, the method is run on different resolutions of the image.

According to an embodiment of the invention, a first feature extraction process may be used to extract a first set of current features and a first set of current feature descriptors is built for the first set of current features, and a second feature extraction process may be used to extract a second set of current features and a second set of current feature descriptors is built for the second set of current features, wherein the first feature extraction process and the second feature extraction process, or a first feature descriptor creation process and a second feature descriptor creation process are different from each other, and the feature matching process of the first and the second set of current feature descriptors are performed by hardwired logic or configurable logic. The matching process of the first and the second set are performed independently from each other by the hardwired logic. FIG. 3 shows how the overall process could look like, where 1 . . . n denotes different feature extraction methods, 1 . . . m denotes different feature descriptor processes and the different resulting descriptor sets are matched.

In a further aspect, the method may comprise performing geometric verification after feature matching to remove incorrect feature matches or to remove false positives in the case of classification.

According to an embodiment of the invention, the method may further comprise the step of providing a set of reference features, wherein each of the reference features comprises at least one first parameter which is at least partially indicative of a position and/or orientation of the reference feature with respect to a global coordinate system, wherein the global coordinate system is an earth coordinate system or an object coordinate system, or which is at least partially indicative of a position of the reference feature with respect to an altitude, the step of associating with a respective current feature at least one second parameter which is at least partially indicative of a position and/or orientation of the current feature with respect to the global coordinate system, or which is at least partially indicative of a position of the current feature with respect to an altitude, and the step of matching the current feature with at least one of the reference features of the set of reference features by determining the similarity measure between the at least one first parameter and the at least one second parameter.

For example, the method may include the step of defining a search space with a reduced number of reference features within the set of reference features when matching the respective current feature, wherein the search space is determined based on the at least one second parameter.

According to an embodiment, the method may include the step of considering indicators of the feature extraction process, for example the sign resulting from feature extractor. For example, the sign of a SURF feature corresponds to the sign of the Laplacian of Gaussian during the feature extraction.

According to an embodiment of the invention, in a method for constructing a feature descriptor, feature points are extracted from the image to gain feature points in a 2-dimensional description (parameters a0, a1). and the feature orientation is computed for the extracted feature point using spatial information on the orientation of the capturing device (parameters b0, b1, b2) provided by a tracking system. For example, the tracking system gives the orientation of the capturing device with respect to a world coordinate system as Euler angles and feature descriptors are supposed to be aligned with the gravitational force. A very simple way to gain the orientation for all features is to transform the gravitational force to a coordinate system attached to the capturing device using the Euler angles first and then project it onto the image plane. Thereby, the direction of the gravitational force in the image is computed and used for all features in the image. This technique assumes orthogonal projection which is generally not the case. Incorporating the intrinsic parameters of the camera relaxes this assumption but still all techniques based on 2D images assume everything visible in the image to lie on a plane and therefore are approximations. According to an embodiment of the invention, one or more directions of the at least one feature are computed based on pixel intensities of neighboring pixels and stored with respect to the common coordinate system. In the matching stage only features with similar directions with respect to the common coordinate system are matched to reduce the number of comparisons needed and decrease the ratio of false matches.

According to an aspect of the invention, at least one of the current feature descriptor or the reference feature descriptor is a higher level description of an object, making it invariant to scale and/or rotation and/or light.

According to embodiments of the invention, the method may also include a method of detecting and describing features from an intensity image which is invariant to scale resulting from the distance between the capturing device and the object, but is sensitive to the real (physical) scale of an object for a variety of applications. It is thus proposed to utilize the depth of an element in the intensity image (e.g. a pixel) for feature detection and/or description at that particular element (pixel) in an intensity image. Thereby, features can be detected and described at real (physical) scale, providing an improved distinctiveness compared to standard scale-invariant feature descriptors on intensity images without introducing any constraints on the camera movement. In one embodiment, the method may comprise the steps of providing an intensity image captured by the camera, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature.

According to an embodiment of the invention, the method may further comprise the steps of providing a measurement of a position and orientation of the capturing device in a global coordinate system, determining a pose of the capturing device from the measurement, providing a 3D model of an environment, wherein the pose is used in combination with the 3D model to compute the depth of at least one element of a feature in the intensity image, for example by means of casting a virtual ray from the capturing device center through the feature into the 3D model.

Measurements of position of the capturing device in a global coordinate system may be provided by a GPS sensor/receiver, IR or RFID triangulation, or by means of localization methods using a broadband or wireless infrastructure. Measurements of orientation of the capturing device in a global coordinate system may be provided by at least one of an inertial sensor, an accelerometer, a gyroscope, a compass, or a mechanical, electromagnetic, acoustic, or optical tracking system. In the context of the invention, an inertial sensor may, e.g. continuously, provide sensor information including the position and/or orientation of an object or device with regard to the environment, by using any combination of the following: magnetometer (e.g. a compass), motion sensor/rotation sensor (accelerometers/gyroscopes), gravity sensor, and other sensors providing such information.

BRIEF DESCRIPTION OF THE DRAWINGS

Embodiments of the invention will be further described with reference to the following Figures, in which.

DETAILED DESCRIPTION OF THE INVENTION

Figure 1:
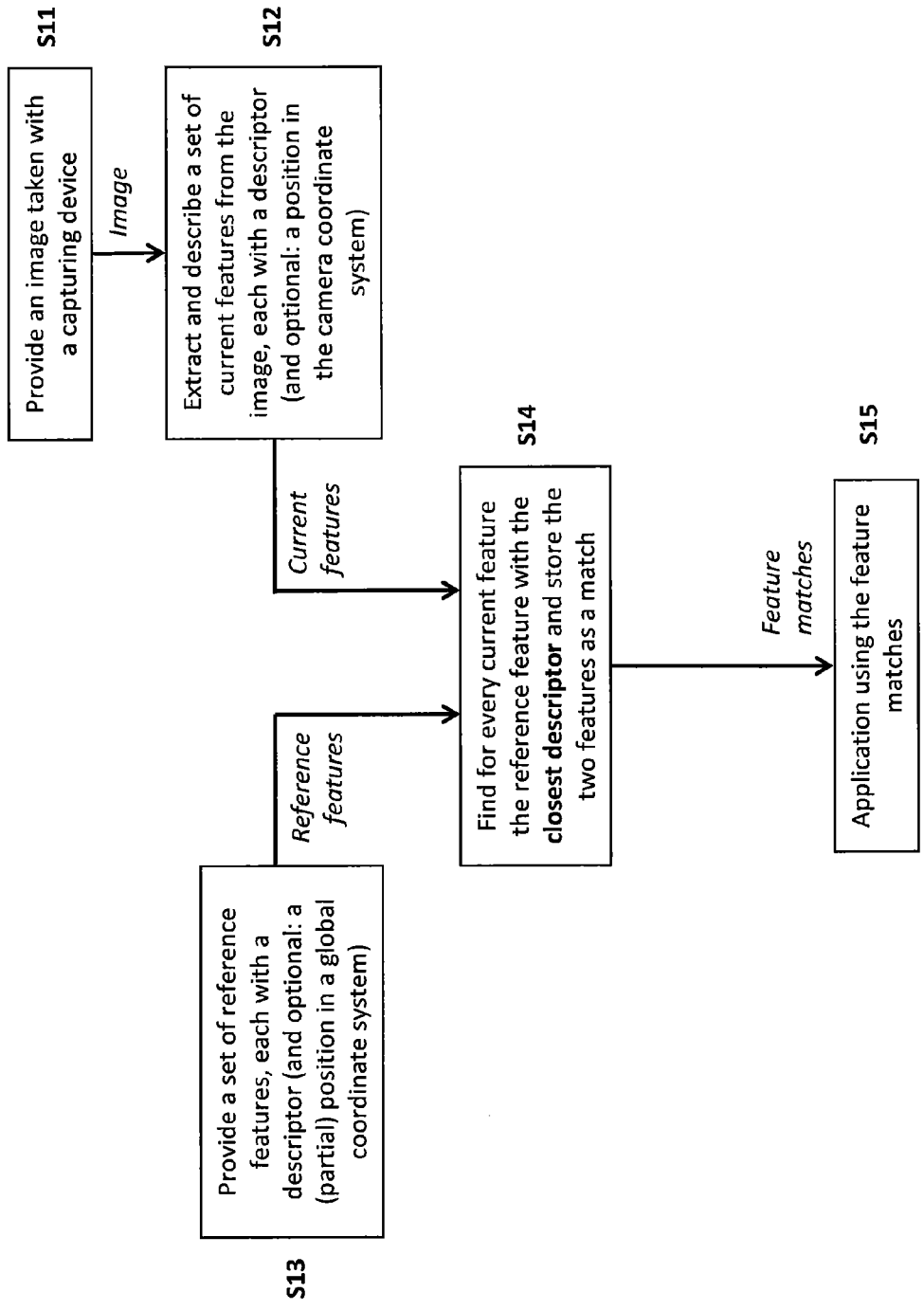
FIG. 1 shows a flow chart of a standard method to match a set of current features with a set of reference features.
Figure 2:
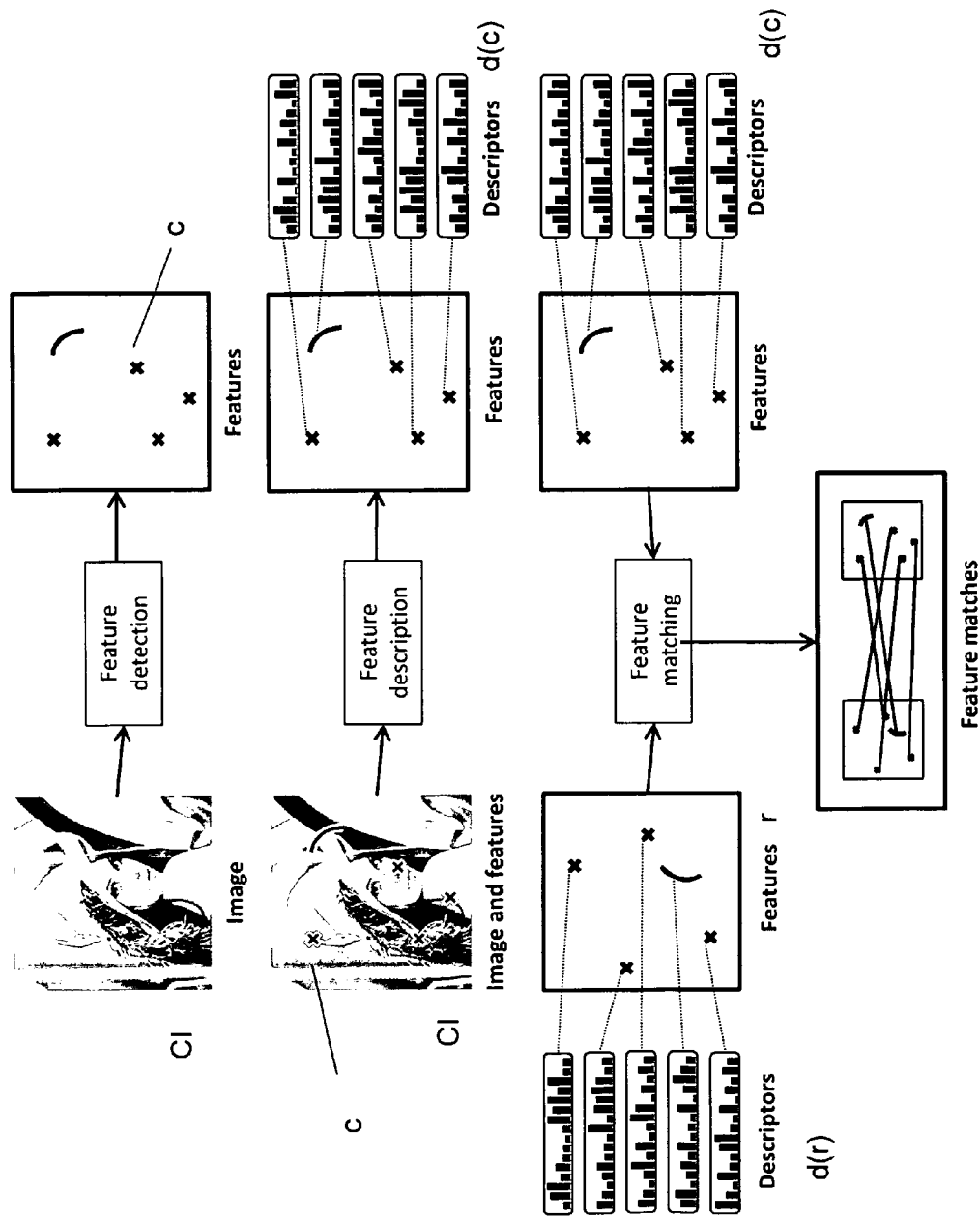
FIG. 2 is a depiction for illustrating detection, description and matching of features in connection with FIG. 1, FIG. 3 describes an embodiment of a process of feature matching and a possible application thereof with the aid of a graphic processing unit (GPU)

An initialization process has been briefly introduced in the beginning and is shown in FIG. 1. Improvement may be measured in the time to initialization process and the success rate of initialization. On mobile systems, the power consumption is another important aspect. The invention presents a new approach by sensibly selecting the most useful building block of the initialization process for implementation into hardware and by adapting the software accordingly in order to take advantage of the optimization.

Looking at the process chain from feature detection, feature description to feature matching, all initialization processes have the matching process in common. In this process, features from a previously recorded object or environment are matched against features from the current camera image. Also, in comparison to feature extraction and feature description, the matching algorithm does not require constant and frequent adoption and changing.

By doing so, the method of the present invention not only improves time and power consumption, but also allows an improved success rate of the algorithm. In addition, the precious chip size is not wasted on constantly changing algorithms Adopting the invention leads to major improvements while only using a small chip area and keeping flexibility in the information extraction process.

According to preferred embodiments, it is possible to classify objects (visual search process), which is the process of matching a current image with a previously generated class description, or to match individual features (feature matching process), which can then be used to run a pose optimization process. Keep in mind that visual search may be based on matching several features per image. At the same time, the whole image might be a feature. Both approaches are supported by the invention.

A class description can be associated with a camera pose and can also be used to generate an initial camera pose estimate.

Figure 3:
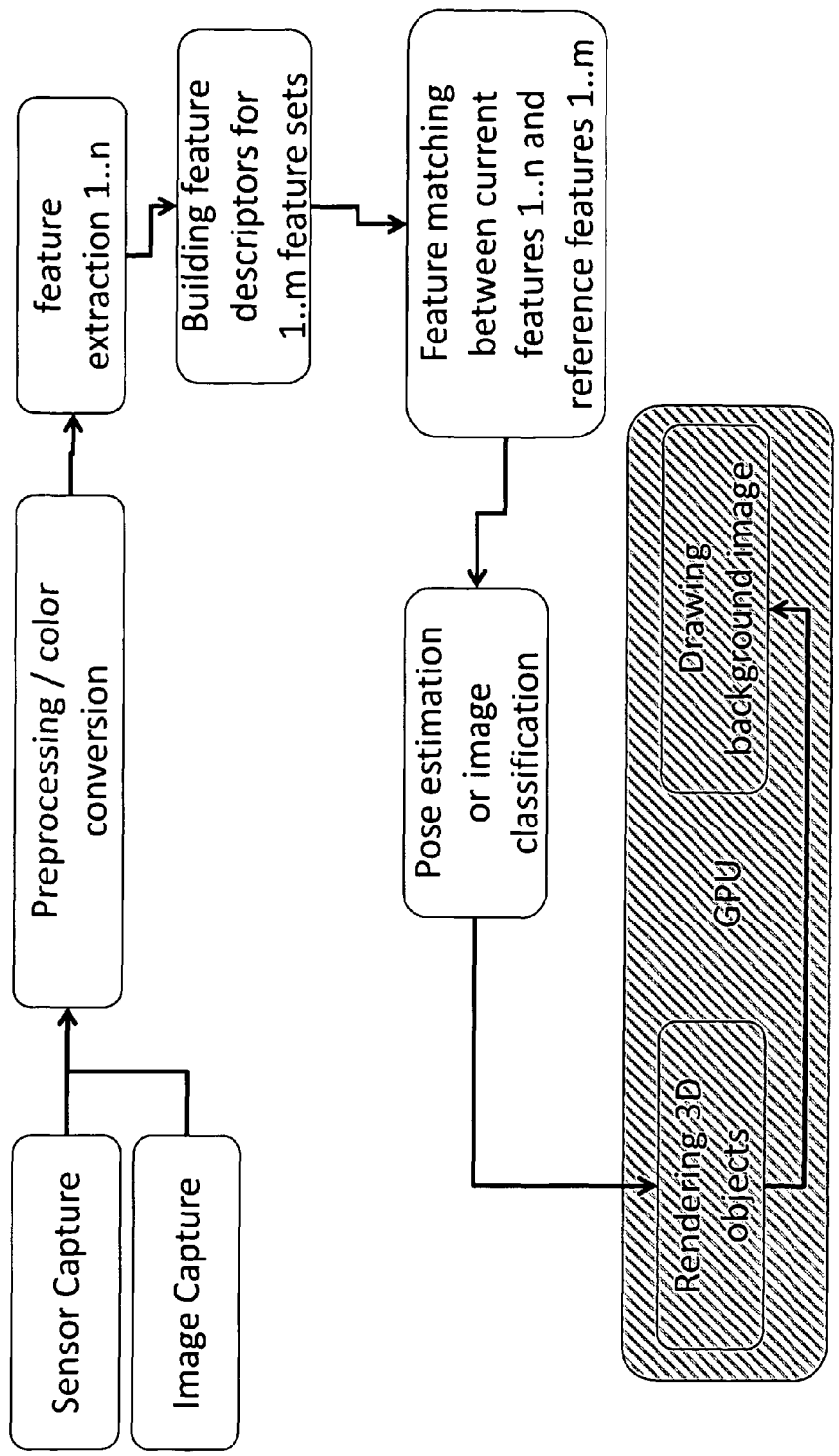

According to the invention, both the visual search process and the feature matching process can work with different features and feature descriptors present in the database and present in the current image. In that case, the different features are extracted using different feature extraction and/or feature description methods and matched in two independent runs by the hardware unit (as indicated in FIG. 3). For example, first SIFT features are extracted and matched, then SURF features are extracted and matched.

FIG. 3 describes a process of feature matching similarly as described above with reference to FIG. 1 and an application of the matching for pose estimation, rendering 3D objects and drawing a background image. The rendering and the drawing of background image is made on a graphic processor unit (GPU).

One advantage of the invention is the possibility to leave out processing steps, which were necessary before or to run them in a completely different advantageous configuration. For example, the feature extraction process can be neglected or left out, creating a very high number of descriptors. Instead, every pixel or a very high number of randomly selected pixels may be chosen as the descriptor center. In this case, each pixel or each of the selected pixels is to be seen as a feature in terms of the present invention. Instead of choosing random pixels, a grid can be used to extract the descriptor centers, for example, every $10^{th}$ pixel of a line, where every $10^{th}$ pixel row is analyzed. The massive increase in features to match (ca. 10.000 features per image) resulted in an increase of successful initializations by 76% on a test-database of several thousand images.

Figure 8:
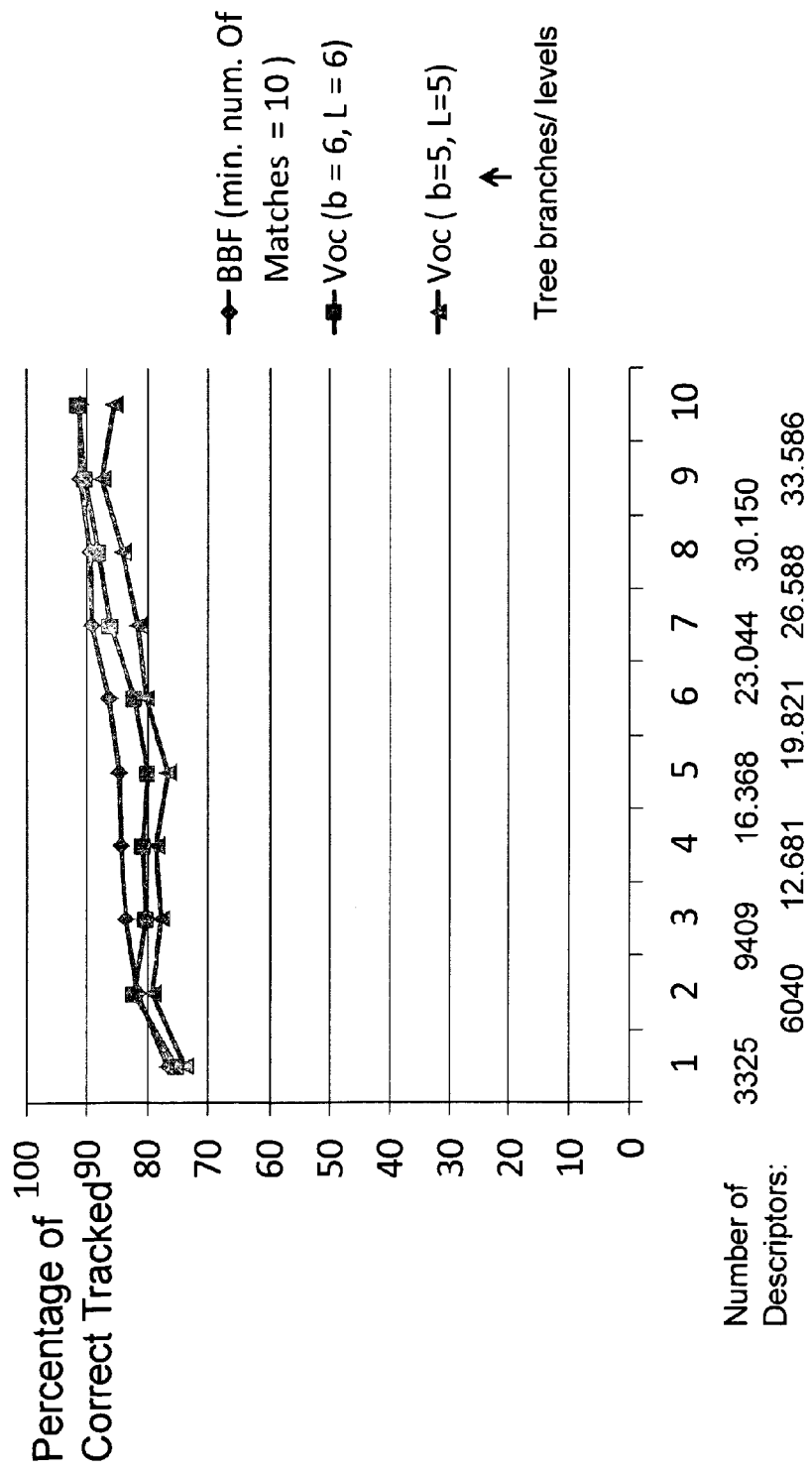
FIG. 8 shows a diagram regarding the performance of vocabulary tree versus best bin first in a matching process.

Accelerating the matching avoids having to build efficient matching structures, like vocabulary trees, which do not give better results and are only built for performance reasons. FIG. 8 shows a performance comparison (indicated by the percentage of correctly tracked reference images per class) when using a vocabulary tree (Voc) with 5 branches (b) and 5 levels (L) or 6 branches and 6 levels respectively, or a best bin first (BBF) approach with a defined minimum number of 10 matches. The BBF approach may be considered as an approximation to an exhaustive search. Another major disadvantage of vocabulary trees is, that they will only return a class, but not individual feature correspondences, which are necessary to calculate an accurate camera pose.

Measures to avoid false matches, when working with many features are to increase the number of PROSAC Chum, O. and Matas, J. "Matching with PROSAC—progressive sample consensus" 2005 *Proceedings of IEEE Conference on Computer Vision and Pattern Recognition* (2005): 220-226 ("Chum") iterations (being higher than 5000) for initialization and introduce additional sanity checks (based on geometric verification).

Advantageously, it may be tested during the process whether a feature pair can theoretically fit or not. This may be achieved by checking the current feature's estimated position against the reference feature's recorded position. According to this aspect of the present invention, it is proposed to narrow the search space or influence the distance measure for matching image features of a current image taken by a capturing device by considering the (partial) knowledge of their position in world coordinates (or global coordinates). A global coordinate system may be an earth coordinate system or an object coordinate system (e.g. a building or a product package or a car), which has a fixed altitude or a fixed orientation related to earth's gravity. As the degrees of freedom of a feature's position that can be determined are heavily depending on the available information on the position and orientation of the capturing device, different exemplary implementations of aspects of the present invention are explained below with respect to FIGS. 4 and 10 in more detail.

It is another aspect of the invention to take indicators of the feature extraction process into account, like the sign resulting from SURF feature extractor (positive or negative Laplacian of Gaussian).

Another aspect of the invention not only takes into account the minimum distance between two feature descriptors, but also the distance between the minimum distance and the second best distance. Particularly, two descriptors are considered as a match, if the second best distance multiplied with a scalar factor smaller than 0.9 is bigger than the best match's distance. This avoids the occurrence of false positives (wrongly matched features), which will lead to wrong classifications or problems in the pose estimation.

In another aspect of the invention, all current feature of the current image are matched against each other, removing features, which are very similar to each other (the distance measure being below a certain threshold). The filtered set of current features is then matched against reference features.

Another aspect of the invention allows the efficient matching or alignment of 3D models through an iterative closest point (ICP) approach.

Standard ICP running on point cloud sets works with the following steps:

1. Compute the closest points using exhaustive search or using a tree-based search (a maximum search radius needs to be set);
2. Given the closest points correspondences a pose is estimated;
3. Given the estimated pose, one of the point clouds is transformed;
4. If the estimated pose is smaller than a threshold, the process is finished, otherwise return to step 1.

In this approach, many distances between two points in 3D space have to be tested in order to find the closest distance. Because the engine is built flexible enough to define the calculated feature distance not only as a distance between descriptors, but also the estimated distance of 3D positions, pure ICP or ICP, coupled with a 3D descriptor, can be accelerated. The algorithm could pass a number of current 3D points to the engine and match it against a higher number of reference-points, which are selected in the vicinity of current 3D points, for example by defining a maximum search radius.

The invention is well suited for object classification. The invention is also well suited for camera pose initialization, where no or incomplete prior knowledge about the object's pose in relation to the camera is available.

Feature Detection:

A feature is a salient element in an image which can be a point, a line, a curve, a connected region or any other set of pixels. Also, a pixel, all pixels of an image, or each of a set of selected pixels may be defined as a feature in terms of the present invention.

Feature detection algorithms are usually saliency detectors. For example, they find lines, edges, or local extrema of a differential operator. A feature detector can be seen as a function mapping a region of pixels to a response. In the literature, this region is referred to as sampling window or measurement aperture of the feature detector. The response is eventually thresholded to decide which elements are features and which are not. In order to extract features at a certain scale, either the sampling window can be scaled accordingly or the image is scaled before computing the response of the feature detector. The size of a feature is then defined as the size of the sampling window used to detect it.

Common examples for keypoint detection methods include Laplacian of Gaussian (LoG), Difference of Gaussians (DoG), Determinant of Hessian (DoH), Maximally stable extremal regions (MSER), Harris features, or learning-based corner detectors such as FAST.

3D features also represent a possible data source for this invention. 3D features can be extracted from depth images or 3D models by many methods, for example identifying local extrema.

In one aspect of the invention, the whole image may also be seen as a feature.

In another aspect of the invention, the combination of 3D data and intensity data can be used as input data, as for example described in Wu, Changchang et al. "3D model matching with Viewpoint-Invariant Patches (VIP)" *IEEE Conference on Computer Vision and Pattern Recognition* (2008) 0 (2008): 1-8 ("Wu").

Feature/Image Description:

The visual features extracted (feature points, edges, corners, local extrema, etc.) need to be repeatable which means that their extraction should be possible despite different viewpoints (orientation, scale, etc.), light conditions and/or image noise.

The matching process consists of finding at least one corresponding visual feature which is extracted from two or more images. It often requires the creation of descriptors that allow that the same physical feature in different images is described in a similar way with respect to some similarity or distance measure. An overview and comparison of some feature point descriptors is given in Mikolajczyk, K. and Schmid, C., "A Performance Evaluation of Local Descriptors." 2005 *IEEE Trans. Pattern Anal. Mach. Intell.* 27, 10 (2005): 1615-1630 ("Mikolaiczyk"). Once one or multiple descriptors for every extracted feature are created, they are matched according to the similarity or distance measure: to every feature in the query image a match is assigned using nearest descriptor or based on the ratio test of Lowe.

Bosch describes a descriptor that represent local image shape and its spatial layout, together with a spatial pyramid kernel.

Uchiyama, Hideaki, and Marchand, Eric. "Toward Augmenting Everything: Detecting and Tracking Geometrical Features on Planar Objects" 2011 *International Symposium on Mixed and Augmented Reality* (2011):17-25 ("Uchiyama") describes a descriptor based on the spatial relationship of features, which is also a possibility. The approach is to select n nearest neighbors of a point X in a set Pn. Select m<n points from Pm. Compute all possible invariants based on f points of m (f=5 for the cross ratio and f=4 for the affine invariant). The sequence of the invariants in a fixed order is one descriptor of the point X. The affine invariant is the ratio between two triangle areas: $A(a,c,d)/A(a,b,c)$. The perspective invariant is the cross ratio of triangle areas: $(A(a,b,c)*A(a,d,e))/(A(a,b,d)*A(a,c,e))$. In Uchiyama, a hashing process is used to match features, which could be left out, using our engine.

Taati, Babak: "Generation and Optimization of Local Shape Descriptors for Point Matching in 3-D Surfaces." Thesis (Ph.D, Electrical & Computer Engineering)—Queen's University, Kingston, Ontario, Canada, August 2009 ("Taati") gives a good overview on 3D and depth-image based descriptors for matching.

Overall for this invention, a descriptor can advantageously be a vector, which is derived from a 2D image or a part of a 2D image or 3D data, which is created by not just transforming pixels into a different color space or normalizing their values. In another aspect of the invention, descriptors are derived from histograms, statistics or relative relations on pixel, shape or depth values.

Figure 5:
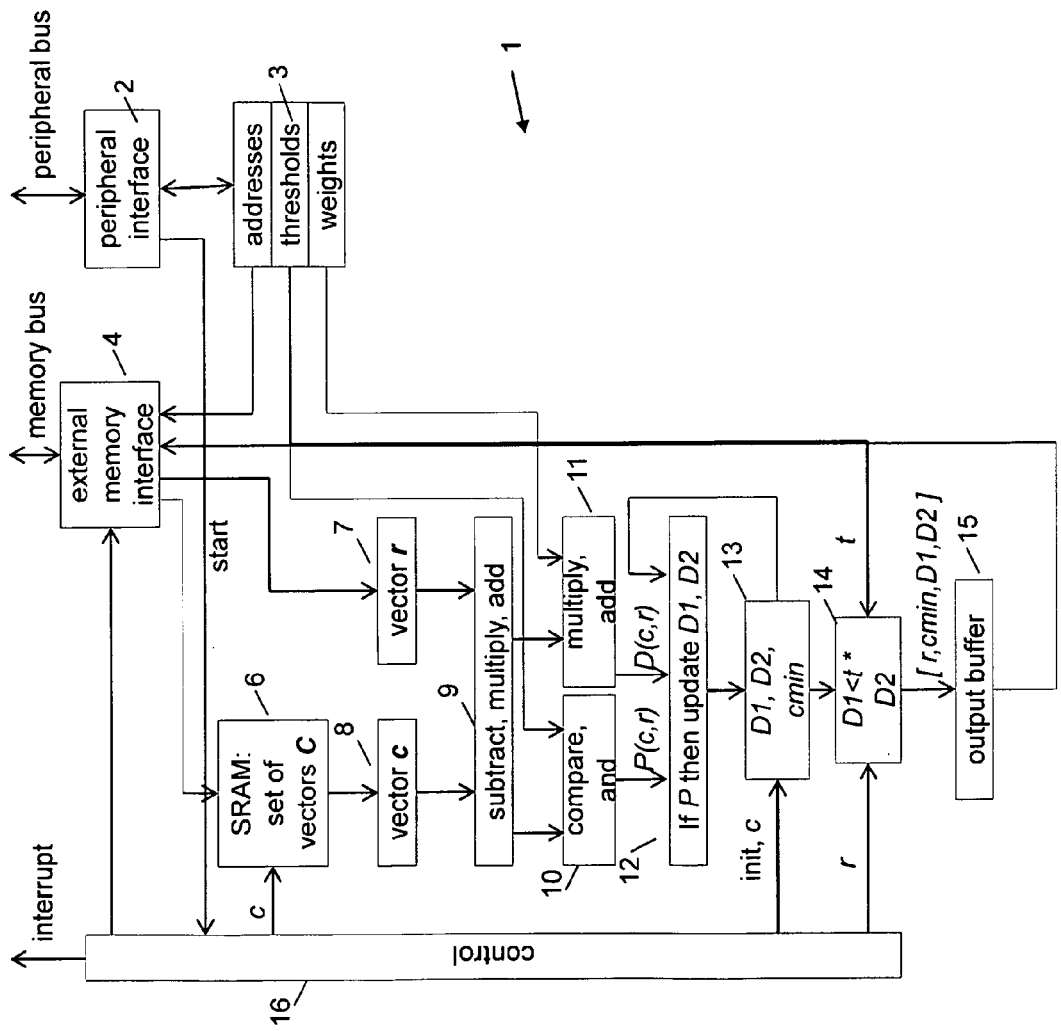
FIG. 5 shows a possible implementation of the determination of a similarity measure in a matching process on an integrated circuit according to an embodiment of the invention.
Figure 7:
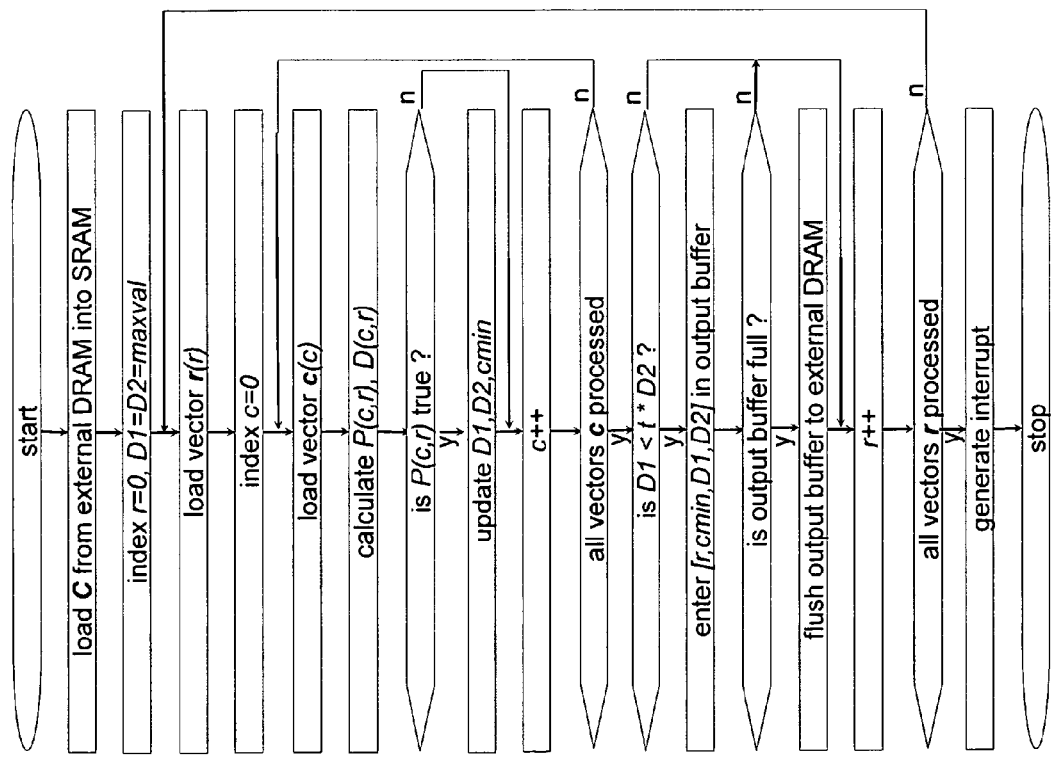
FIG. 7 shows a flow chart of a general workflow of the process as described with reference to FIGS. 5 and 6.

Matching Process:

The matching process is a key building block in the invention's solution. A possible layout according to an embodiment is shown in FIG. 5. A possible process diagram is shown in FIG. 7. According to an embodiment, it combines the following calculations:

As a similarity measure according to the present invention, for example, a distance measure may be used. $D(c, r)$ describes an advantageous distance measure between two descriptors, according to our invention. Particularly, it describes a distance measure between a current feature descriptor $d(c)$ of a current feature c and a reference feature descriptor $d(r)$ of a reference feature r. For example, current features c and reference features r and their feature descriptors $d(c)$ and $d(r)$ are determined and provided, respectively, as described above with respect to FIG. 1.

Generally, a respective distance measure $D(c, r)$ may be determined between one or more properties of the respective current feature c including the respective current feature descriptor $d(c)$ and one or more properties of the respective reference feature r including the respective reference feature descriptor $d(r)$.

The method of the invention may include determining a respective first distance measure $\Delta d$ between each respective current feature descriptor $d(c)$ and each respective reference feature descriptor $d(r)$ for the determination of the similarity measure $D(c, r)$.

According to an embodiment, the method of the invention may include determining a respective second distance measure (here $\Delta x$ and/or $\Delta y$) between position information $x(c)$ and/or $y(c)$ of the respective current feature descriptor $d(c)$ in the current image and the respective position information $x(r)$, $y(r)$ of the respective reference feature descriptor $d(r)$ in a common coordinate system for the determination of the similarity measure $D(c, r)$. For example, this may be computed as the Euclidian distance between the 3D position information $x(c)$ of the respective current feature described by $d(c)$ and the 3D position information $x(r)$ of the respective reference feature described by $d(r)$.

According to a further embodiment, the method of the invention may include determining a respective third distance measure $\Delta z$ indicative of an angle between the position information $z(c)$ of the respective current feature descriptor $d(c)$ in the current image and the position information $z(r)$ of the respective reference feature descriptor $d(r)$ in a common coordinate system for the determination of the similarity measure $D(c, r)$. For example, this may be computed as the scalar product between a first vector $z(c)$ defined by the camera center and the 3D position information of the respective current feature and a second vector $z(r)$ defined by the camera center and of the 3D position information of the respective reference feature.

In another embodiment, $\Delta z$ can be indicative of an angle between the camera orientation in respect to a global coordinate system and an individual directional property of a feature, e.g. derived from the surface normal of a known surface on which the feature is located.

According to a further embodiment, the method of the invention may include determining a respective fourth distance measure (here, $\Delta u$ and/or $\Delta v$) between a scalar property $u(c)$ and/or $v(c)$ of the respective current feature descriptor $d(c)$ in the current image and the respective scalar property $u(r)$, $v(r)$ of the respective reference feature descriptor $d(r)$ for the determination of the similarity measure $D(c, r)$. For example, this may be computed from the sign of SURF (positive or negative Laplacian of Gaussian).

According to a further embodiment, the method of the invention may include determining a respective combined distance measure $D(c, r)$ for the determination of the respective similarity measure by combining at least one of the respective first, second, third and fourth distance measures with at least another of the respective first, second, third and fourth distance measures.

For example, $D(c, r)$ can be the combination of $\Delta u$, $\Delta v$, $\Delta x$, $\Delta y$, $\Delta z$, and/or $\Delta d$.

$P(c,r)$ describes another advantageous, optional part of the invention's matching process. It may be used in a check, whether two descriptors should be matched at all. Mostly, this is helpful to avoid wrong matches. P checks, if certain conditions are met, depending on given thresholds.

According to an embodiment, the method of the invention may include determining a check parameter P, which is calculated in order to determine whether a feature pair c, r with one of the current features and one of the reference features is eligible to be a valid match.

According to an embodiment, the method of the invention may include determining at least one respective check parameter P(c, r) by comparing at least one of the respective second distance measure $\Delta x$ and/or $\Delta y$, third distance measure $\Delta z$ and fourth distance measure $\Delta u$, $\Delta v$ with at least one respective threshold, wherein the check parameter P(c, r) is used to determine whether a feature pair c, r with one of the current features and one of the reference features is eligible to be a valid match.

For example, the method may further include weighting at least one of the properties of the respective current feature c and reference feature r, or at least one of the distance measures between one or more of the properties. Further, the method may include weighting at least one of the first, second, third and/or fourth distance measures when determining the combined distance measure D(c, r).

Particularly, each of the above described components can be given a weight (such as $w_u$, $w_v$, $w_x$, etc.), which depends on the information available to the system. Information used here can be information coming from the feature extraction process or an estimation of the current feature's position in a global coordinate system or the camera coordinate system (e.g. for stereo matching taking advantage of epipolar geometry constraints). If this kind of information is not available, the respective weights in formula D(c,r) can be set to zero or a value, for example depending on the information's uncertainty. If incomplete or no information about $\Delta u$, $\Delta v$, $\Delta x$, $\Delta y$, $\Delta z$ is given or available, the threshold values can be set to a very high value or be scaled, depending on uncertainty information.

According to an embodiment, the portions of the distance measure D(c, r) as described above, such as $\Delta u$, $\Delta v$, $\Delta x$, $\Delta y$, $\Delta z$, and $\Delta d$, can be determined as follows:

$$\Delta u = (u(c) - u(r))^2$$

$$\Delta v = |v(c) - u(r)|$$

$$\Delta x = \sum_{i=0}^{3} (x_i(c) - x_i(r))^2$$

$$\Delta y = \sum_{i=0}^{3} (y_i(c) - y_i(r))^2$$

$$\Delta z = \sum_{i=0}^{3} z_i(c) \cdot z_i(r)$$

$$\Delta d = \sum_{i=0}^{47} |d_i(c) - d_i(r)|$$

The given length of 48 for the feature descriptor shall be understood as a possible implementation of an embodiment and shall not be understood as limiting the invention. Naturally, the length could be built longer or shorter. Similar, other or additional types of distance measures may be computed and considered.

According to embodiments of the invention, as set out in the above formulas, calculating the respective distance measures may comprise computing sum-of-differences or sum-of-square-differences for determining the respective distance measure over a respective length or dimension (i).

According to an embodiment, the check parameter P(c, r) and the distance measure (D(c, r)) can be determined as follows:

$$P(c,r) = \Delta u < \theta_u \wedge \Delta v < \theta_v \wedge \Delta x < \theta_x \wedge \Delta y < \theta_y \wedge \Delta z > \theta_z,$$

$$D(c,r) = w_u \cdot \Delta u + w_v \cdot \Delta v + w_x \cdot \Delta x + w_y \cdot \Delta y + w_z \cdot \Delta z + w_d \cdot \Delta d$$

For example, the fields u, v, x, y, z and d, can be integer or floating point storage units of arbitrary bit width. In one advantageous implementation of the invention, the descriptor fields $d_i$ are each one byte long.

The hardware was specifically designed to solve the whole descriptor matching problem efficiently, not just accelerating the sum of absolute differences. If only a part is optimized, little performance gain is achieved, because of cache-misses etc. Therefore, the hardware includes its own memory (in FIG. 5: SRAM 6), loading the vector of current descriptors (current descriptors have been extracted from the current image).

With respect to the above described functions or steps of calculating the respective similarity measures, distance measures, combined distance measures, check parameters, etc., as set out above, the integrated circuit according to the present invention includes a respective unit or units implemented on the integrated circuit which perform the respective functions or steps. Examples of such units are described in more detail below with reference to FIGS. 5 and 6. These examples, however, shall not be understood as limiting the invention, as the skilled person will understand that there are multiple options of implementing the described functions or steps according to the teachings of the invention in hardwired logic or configurable logic.

According to FIGS. 5 and 7, a possible implementation of the determination of the similarity measure in a matching process according to an embodiment of the invention is shown. The similarity measure is determined on an integrated circuit 1, which may be configured in an embodiment as shown in FIG. 5. Particularly, the integrated circuit 1 includes hardwired logic or configurable logic which processes logical functions for determining the similarity measure. One embodiment of the invention runs as follows:

Via the peripheral interface 2, the host processor (not shown) accesses configuration registers 3 storing addresses, thresholds and weights (their usage is discussed later). Then it starts the operation by writing to a virtual trigger register. The external memory interface 4 reads the vector sets C (a number of current descriptor vectors c found in the current image) and R (a number of reference descriptor vectors r created based on reference images) from an external DRAM. C is completely read into the internal SRAM 6 when the operation starts, as explained above. Vectors from R are read one by one into the register 7 with content "vector r". Vectors from the SRAM 6 are then read one by one into the register 8 with content "vector c". The unit 9 "subtract, multiply, add" calculates the intermediate values u, v, x, y, z, d as discussed above. In compare unit 10, these values are compared to the thresholds ("compare, and") and weighted in unit 11 ("multiply, add"), yielding the values P(c,r) and D(c,r) as described above. In case more current descriptor vectors c have been extracted from the current image than the SRAM 6 can hold at once, the current descriptor vectors may be divided into two or more portions (c1, c2, . . . cn) and may be loaded into the SRAM 6 and be processed by the integrated circuit 1 one after another.

In unit 12, it is determined whether P is true. If P is true, then D is compared to the values D1, D2 in register 13, which register 13 is updated to contain the minimum value D1 and the second smallest value D2 of the values D(c, r) determined until then, and the index c of the minimal value D1 is kept as cmin. After all vectors c from the SRAM 6 are processed, the condition D1<t*D2 is checked in unit 14. In other words, it is determined whether the ratio of D1 and D2 falls below a defined threshold t from the configuration register 3 in order to determine whether D1 is significantly smaller than D2. If the condition is true, then a new tuple [r,cmin,D1,D2] is sent to the output buffer 15. When the output buffer 15 is full, its content is written to an external memory via the external memory interface 4 and memory bus. The overall control of this process is performed by control unit 16.

FIG. 5 shows an overview of an embodiment of the components, whereas FIG. 7 shows the general workflow of the process as described above.

The components as described above and their functions (also referred to as a hardware engine in the context of the present invention) are implemented on the integrated circuit by hardwired logic or configurable logic which processes logical functions for determining the similarity measure on the chip. In other words, the functions to be performed in the matching process, as described above, may be implemented directly by means of a corresponding digital electronic circuit, particularly by means of a hardwired logic or configurable logic. Such electronic circuit may be implemented in a flexible manner using an integrated circuit of the digital technology, in which a desired logical circuit may be programmed. That is, for the integration of a function according to the invention, as described above, an existing processing system, at the appropriate location, may be provided with or supplemented with at least a programmable logical circuit, such as a PLD (Programmable Logic Device) or an FPGA (Field Programmable Gated Array). Such a logical circuit may be implemented, for example, on an integrated circuit chip used, for instance, in a mobile device, such as a mobile telephone.

Figure 6:
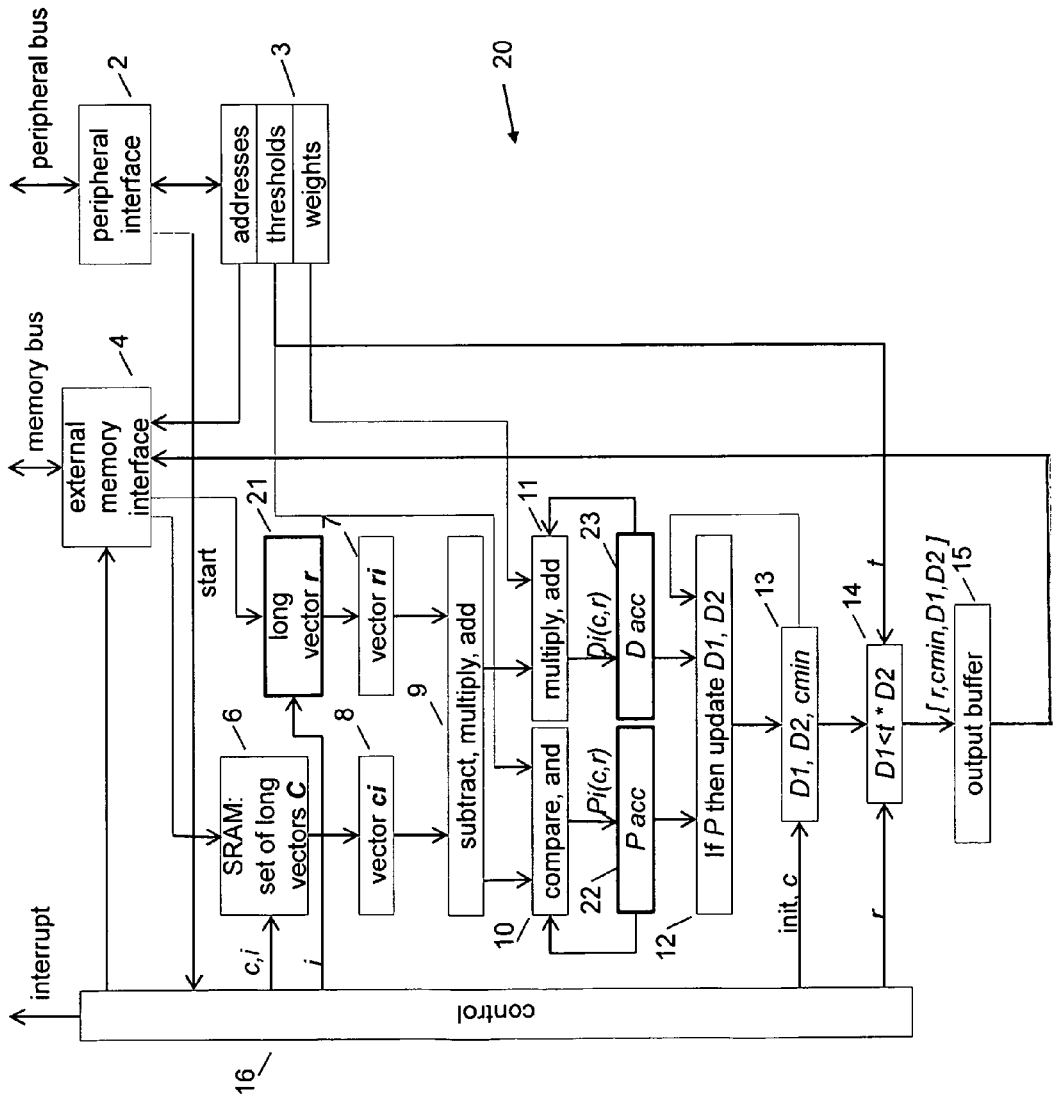
FIG. 6 depicts another possible implementation of the determination of a similarity measure in a matching process on an integrated circuit according to an embodiment of the invention.

FIG. 6 shows another embodiment of a possible implementation of the invention on an integrated circuit 20. This embodiment was developed in order to not only handle short point-based descriptors or other short descriptors, but also longer descriptors e.g. shape-based descriptors, and it extends the above approach to work with longer vectors, e.g. 3000 byte long. As far as the same components are used as in the embodiment of FIG. 5, the respective components are designated with the same reference numbers.

In this variant of the embodiment of FIG. 5, a register bank 21 that holds a long vector r and two accumulator registers 22, 23 holding respective parameters Pacc and Dacc have been added. Only parts ci and ri of long vectors c and r are compared at once. The functions Pi(c, r) and Di(c, r) are calculated incrementally and accumulated in Pacc and Dacc. The final values P and D are then read from these registers 22, 23 before D1 and D2 are updated as before. This extension allows the comparison of much longer vectors with minimum extra hardware effort. FIG. 6 shows an overview of the extended engine's components.

Thus, according to an aspect of the invention, there is provided a register bank that holds a reference feature descriptor vector R and two accumulator registers 22, 23 for holding a respective check parameter (Pacc) and a respective distance measure (Dacc), wherein only parts (ci and ri) of a respective current feature descriptor vector C and reference feature descriptor vector R are compared at once.

Depending on the available size of the SRAM 6 or the number of different descriptors used in the overall recognition/initialization pipeline, the engine can be started several times. For example, it can first find the best matches between point based descriptors and then find the best matches for shape based descriptors, also using different thresholds and weights.

According to an embodiment of the invention, the calculations of P and D are performed fully parallel in a pipelined manner. For example, the overall throughput is one vector comparison per clock cycle: With every cycle, a new vector c is read from the SRAM 6. After the pipeline has been filled, the values of D1, D2, cmin are updated every cycle, too. The flexibility of the engine for computer vision tasks is also of advantage for finding a pose between two 3D point clouds, e.g. gathered with hardware, such as Microsoft Kinect.

Verification:

Visual feature extraction and matching are often two essential steps in image-based classification and image-based localization and tracking.

According to an embodiment, geometric verification is performed after feature matching to remove incorrect feature matches or to remove false positives in the case of classification. This step is also called geometric outlier rejection. Geometric verification is often needed because, whatever descriptor or classifier used, there is often no way to avoid having outliers, i.e. features that are matched incorrectly. The standard approach called RANSAC Fischler, M. A. and Bolles, R. C. "Random Sample Consensus: A Paradigm for Model Fitting with Applications to Image Analysis and Automated Cartography"; 1981 *Communications of the ACM* 24 (1981): 381-395 ("Fischler") is based on an algorithm that performs the following two steps iteratively: First, the algorithm picks randomly a sample of minimum number of features (also called Sample Set) needed to compute the parameters of a certain transformation model. This transformation can generally be described using a matrix e.g. one can use four points in case the pose is computed via a homography matrix estimation, one can use five points in case the pose is computed via an essential matrix estimation, etc. Then, it estimates the transformation parameters and counts the number of matches (also called Consensus Set) that verify them. To decide whether a match mk={rk,ck} verifies the transformation parameters one can, for example, transform the reference feature rk from the reference image into the current image with this estimated transformation parameters and compute the distance between the current feature ck and the transformed reference feature. A match is considered verifying the transformation parameter set when the distance is smaller than a certain threshold Tm. The algorithm performs a number N1 of iterations and searches for the best transformation parameter set allowing the highest number of matches verifying that parameter set (the highest cardinality of the Consensus Set). If the number of matches corresponding to the best parameter set exceeds a certain threshold Nm, the matches in the Consensus Set verifying the parameter set are considered as inliers (correct matches) and the other matches are considered as outliers (incorrect matches). The condition that the number of matches corresponding to the best parameter set exceeds Nm is generally used to validate the success of the matching process. Only in the case of a successful matching process one can determine whether a match is inlier or outlier.

The RANSAC approach can be improved as follows: it is possible to either rank or weigh the Consensus Set based on the matching strength or to give prior probabilities to the Sample Set (see, Chum). The matching strength generally used is based on how good the similarity measure between the descriptors of two matched features is.

Other approaches were proposed to speed up and improve the results of RANSAC like in Hinterstoisser, Stefan et al. "N3M: Natural 3D Markers for Real-Time Object Detection and Pose Estimation," 2007 2007 IEEE 11th International Conference on Computer Vision (2007): 1-7 ("Hinterstoisser") where entities consisting of local and minimal subsets of feature points that have, at the same time, distinctive photometric and geometric properties were conceived to allow stable object detection and reliable camera pose estimation. These entities are called Natural 3D Markers (N3Ms).

Methods to simplify the geometric verifications that are based on the histogram of feature orientation or based on simple line-side checks may be applied as described in Wagner, Daniel et al. "Pose tracking from natural features on mobile phones" 2008 7th IEEEACM International Symposium on Mixed and Augmented Reality (2008): 125-134 ("Wagner").

Figure 9:
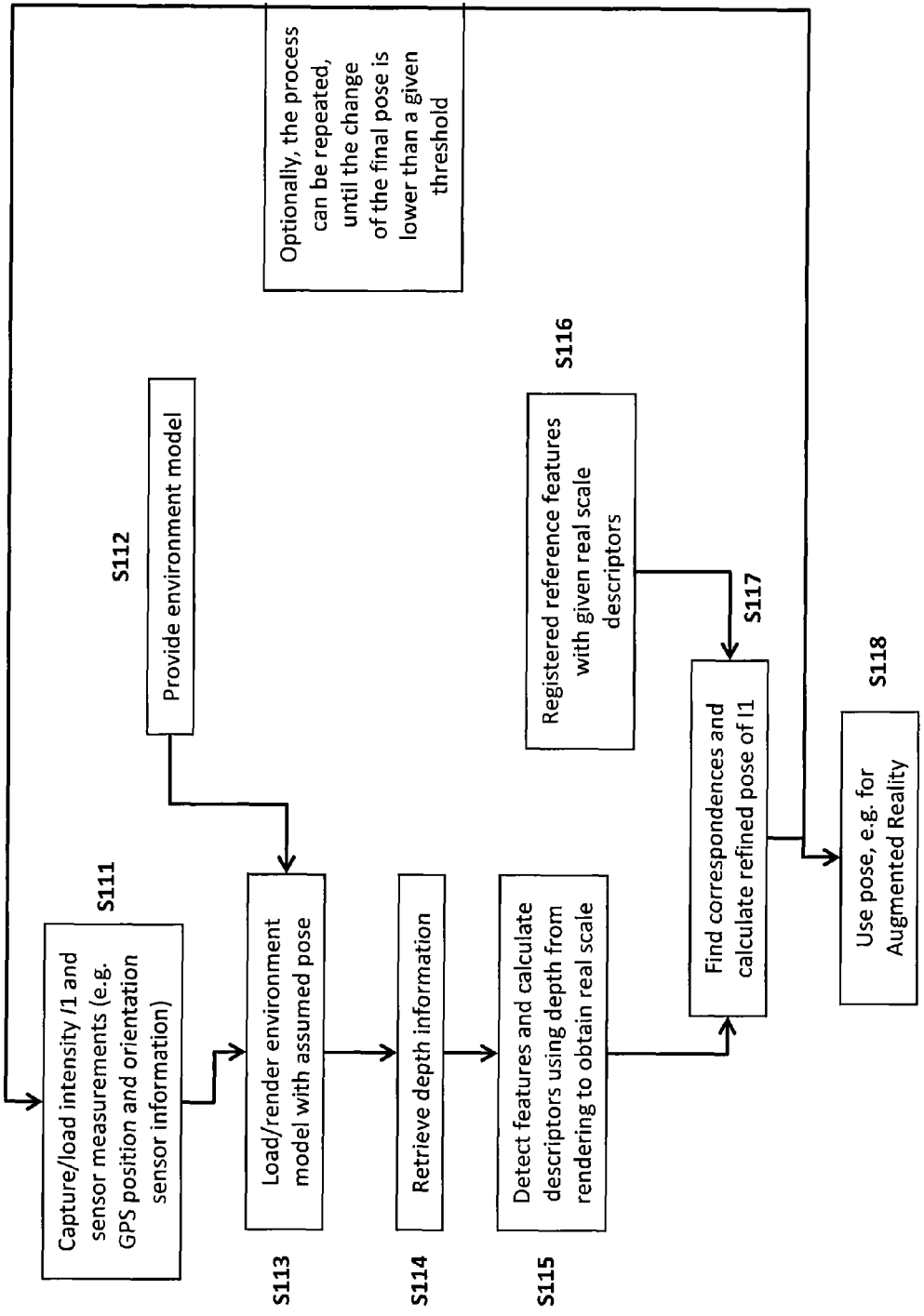
FIG. 9 shows a flow chart of a possible combination of a depth extraction mechanism with physical scale feature descriptors for the use in optical pose estimation according to an embodiment of the invention.

Applications:

FIG. 9 shows a possible use of a descriptor, relying on depth information, in order to give an example of a more complex embodiment of the invention.

According to aspects of the invention, a depth of an element, e.g. of a pixel, in an image may be used as further information when matching features. Generally, the depth of an element in an image (e.g. pixel) may be defined as referring to the distance between the physical surface that is imaged in this element (pixel) and the capturing device, particularly the optical center of the capturing device.

FIG. 9 shows a possible combination of a depth extraction mechanism with physical scale feature descriptors for the use in optical pose estimation, for example, in order to create outdoor AR experiences. In this example depth is extracted using rough sensor data and an environment model, as in FIG. 9.

In step S111, an intensity image I1 is captured by a capturing device or loaded. In addition, an initial pose of the capturing device while capturing I1 is estimated from rough sensor measurements such as GPS position and orientation sensor information. Finally, an advanced environment model including 3D data and image data (similar to Google Streetview) is provided (step S112). Image data is only necessary, if a reference model for tracking (e.g. already containing feature 3D coordinates and feature descriptors) has not been created in advance. In step S113, the environment model is loaded using the assumed camera pose provided by step S111, i.e. the environment model is rendered from the camera viewpoint of intensity image I1. In step S114, depth information is retrieved from the environment model and used in step S115 for calculating the real scale descriptors of detected features. In other words, using the depth information registered with the image I1, real scale features are extracted at a fixed scale of, for example 1 m. Because the environment model combines 3D data and image data, a reference 3D model of physical scale features with a scale of 1 m can be created (S116, this can of course be done in advance).

Figure 10:
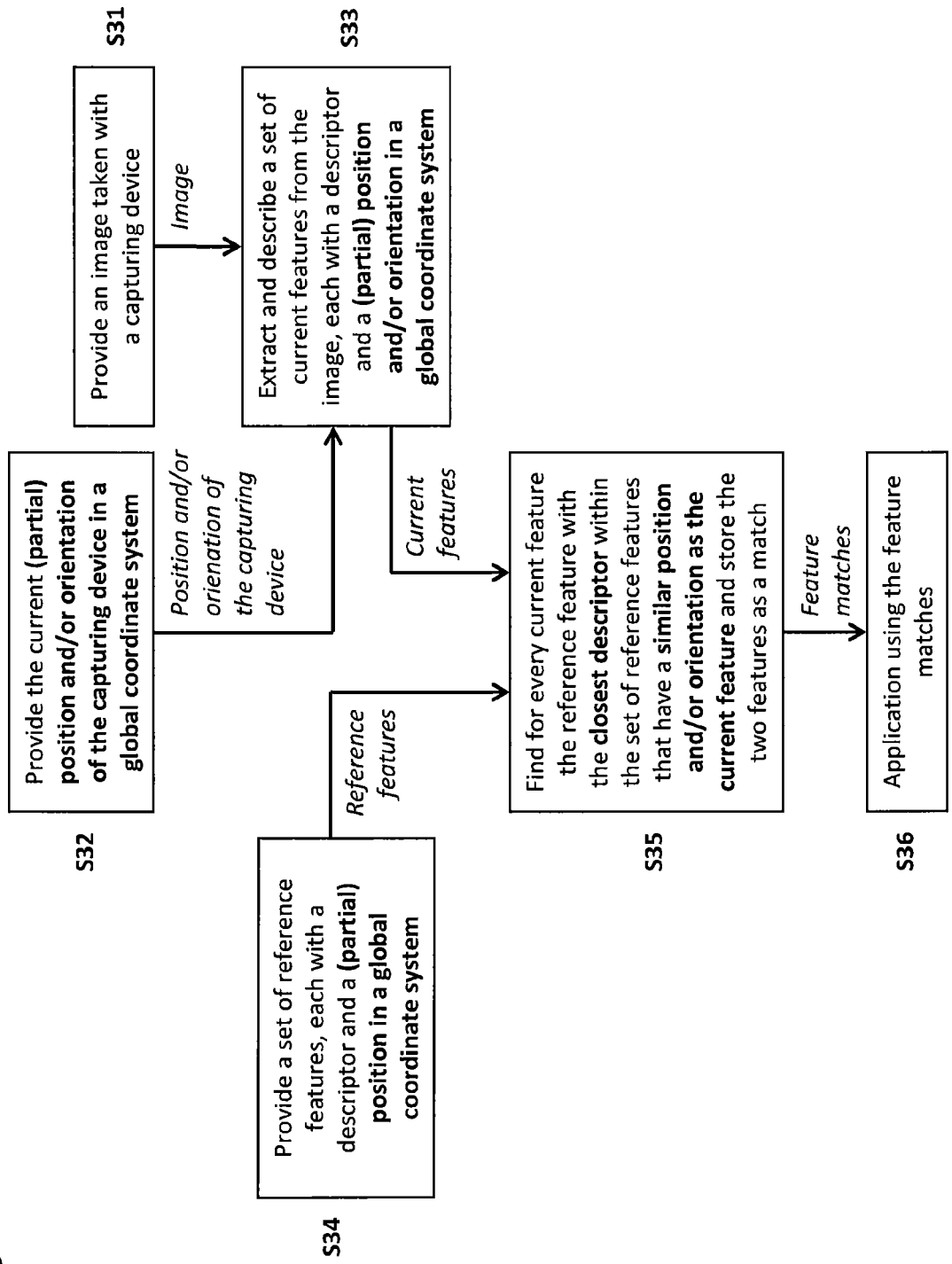
FIG. 10 depicts a flow chart of a method according to another embodiment of the invention where it is checked prior to matching whether a feature may theoretically fit or not.

The results of S115 and S116 can then be used to create correspondences of features in I1 and 3D physical scale features. In this step the hardware engine is used to match the current features of I1 with the model's features. The usage of a 3D model and rough sensor data gives an estimate of the current feature's 3D position in the world coordinate system by shooting a ray from the camera center through the feature's pixel position and assuming the features 3D position to be where the ray hits the virtual 3D model. The position information can be used as $x_0$, $x_1$ and $x_2$ to calculate $\Delta x$ and the descriptor is used to calculate $\Delta d$. Having a good GPS fix and stable orientation data, $\theta_x$ could be set quite low and $w_x$ could be a higher value than zero. FIG. 10 illustrates how position data can help in the matching process.

Using an optimization algorithm, the refined pose of I1 in the environment model's coordinate system can be calculated. The refined pose can then be used for an application, e.g. an Augmented Reality visualization of tourist data, or optionally be used to refine S111 and iterate through steps S111-S117, until the change in pose has gone below a defined quality threshold.

FIG. 10 depicts a flow chart of a method according to another embodiment of the invention where it is checked prior to matching whether a feature may theoretically fit or not. In step S31, a current image taken with a capturing device is provided. The (partial) position and/or orientation of this capturing device in a global coordinate system is provided in step S32. Then, step S33 detects and describes features from the provided current image and computes the (partial) position and/or orientation in the global coordinate system of every current feature. A set of reference features each with a descriptor and a (partial) position and/or orientation in a global coordinate system is provided in step S34, wherein the reference features act as input to the matching in step S35 together with the current features. The proposed matching method (step S35) then finds for every current feature the matching reference feature by looking for the reference feature with the closest descriptor in the set of reference features that have a (partial) position and/or orientation in the global coordinate system close to the (partially) known position and/or orientation of the current feature in that global coordinate system. This knowledge or partial knowledge can be embedded for example in $\Delta x$, $\Delta y$, $\Delta z$. In the end, the feature matches are used in an application in step S36.

The position of a current feature may be described by an equation E that describes a point, a ray, a straight line, a circle, a cone, a cylinder or any other geometric shape. The matching procedure then only considers those reference features as possible matches that have a position whose distance to the geometric shape defined by E is below a threshold theta ($\theta$). Thereby, theta is for instance depending on the determined accuracy of the sensor measures used to compute the current feature's partial position. Depending on the uncertainty of the individual sources of partial spatial information, the distance measure between the position of a reference feature and a current feature does not necessarily need to be the Euclidean distance, but might have different weights for different degrees of freedom (which means position values x and y might be integrated in $\Delta y$, while the height value is integrated in $\Delta x$ with a different theta). Also, it might be depending on the distance between a reference feature and the capturing device. Details of uncertainty propagation can be found in U.S. Pat. No. 7,768,534.

The most naïve approach to the matching procedure in our method is to perform exhaustive search and check for every combination of current and reference feature their spatial distance prior to considering it a possible match and computing the distance between the two descriptors. More elaborate implementations of the idea would use spatial data structures in the descriptor domain and/or the spatial domain to speed up matching. Suitable data structures include but are not limited to bounding volumes (axis-aligned boxes, oriented boxes, spheres, arbitrary volumes), grids (uniform or not), or any kind of trees (e.g. Quadtrees, Octrees, BSP-trees, kd-trees, R-trees). Also, it is not necessarily needed to find a match for every single feature in either one of the feature sets, but the matching process aims to find at least one match between a reference feature and a current feature.

The found feature matches can then be used for applications including object detection, object classification, object localization, and localization of the camera in the global coordinate system. The latter, also referred to as "self-localization", can for instance be performed by means of robust pose estimation methods such as for instance RANSAC, PROSAC or M-Estimators. Note that such methods require an estimate of the intrinsic camera parameters, in particular the focal length. Depending on the available information on the position and/or orientation of the capturing device and the depth of pixels, different possible implementations of the inventive idea arise. They differ in the spatial constraints to narrow search space or P in the matching process depending on the position and/or orientation of reference features that are potential matches for a given current feature. Exemplary examples, that we consider particularly important, will be explained in detail in the following.

The approaches assume an estimate of the camera's intrinsic parameters to be available. This estimate can for instance result from a calibration procedure or a reasonable guess, e.g. based on the camera resolution. Those approaches that are based on an indication of the position of the capturing device can be seen with two different implementations. The longitude and latitude of the device is provided based on measurements, e.g. GPS. Depending on the hardware used, there might be no altitude measurements available or they might be very inaccurate. If a measurement of the absolute altitude of the capturing device is available and can be considered sufficiently accurate, it is used. Otherwise an assumption is used, e.g. that the user is located at street level and holds the capturing device in his or her hand at an altitude of approximate 1.5 to 2 meters above street level. The altitude might then be treated with a higher theta and a lower weight. The altitude of a device can be measured independently from the longitude and latitude, e.g. by means of a barometer.

In the following, we will assume that a feature is a point (i.e. a feature point, keypoint or interest point). The invention can however be implemented in a similar way with any other kind of feature, for instance by treating the center of gravity of a feature as its position. Other features can be edges, edgelets or regions. In the following, an embodiment of the invention is described using ray or point from device position and 3D device orientation as an exemplary implementation.

If the position of the capturing device in world coordinates is known (e.g. by means of GPS and optionally a barometer) as well as the 3D orientation (e.g. measured with a combination of inertial sensors and a digital compass), the method according to aspects of the invention uses this information together with intrinsic parameters of the camera and the position of a current feature in the current image to define a ray in world coordinates that this feature is located on. If in addition an estimate of the feature's depth is available, the method is able to compute the absolute 3D position of the current feature in world coordinates.

In the matching stage, only reference features are considered that are closer to the point or ray, the current feature is located on, than a threshold value (theta). Again, the distance measure between a reference feature and a point or ray can be defined in a way that incorporates one or more uncertainties of the individual degrees of freedom of the position and/or orientation. A suitable spatial data structure for this configuration in the domain of world coordinates would be a uniform grid. The 3DDDA algorithm would, for example, be applied to determine the relevant cells that a ray pierces. For each cell in the grid, any spatial data structure in the domain of the descriptor could be applied to store the reference features contained in that cell, e.g. a KD-tree.

In the following, another embodiment of the invention is described using 1D feature altitude from a 2D gravity direction and 1D feature depth as an exemplary implementation. This embodiment or aspects of the invention described with reference to this embodiment may be used without or in combination with any of the aforementioned embodiments or aspects of the invention.

Provided with a measurement of the gravity vector in a coordinate system associated to the capturing device, e.g. with inertial sensors, and the depth of a current feature in the current camera image, e.g. by means of a depth-from-stereo method, the method according to aspects of the invention computes the relative or absolute altitude of this feature.

The 2D position of a feature in the image together with intrinsic camera parameters enable defining a 3D ray in a coordinate system associated to the capturing device. As in addition the depth of the feature may be known, the feature's 3D position in the camera-aligned coordinate system can be computed. The vector from the optical center of the capturing device to the 3D feature position is then projected onto the normalized gravity vector resulting in an altitude of the feature.

The method described above results in a relative altitude measure with respect to the capturing device. To compute the absolute altitude of the feature, the device's absolute altitude needs to be added. This can be either measured, e.g. via GPS or a barometer, or can be based on an assumption as explained above.

Given a current feature in a current image, the method is looking for a corresponding feature in a set of reference features with (partially known) world coordinates. More particularly, depending on the available information on the position and/or orientation of the capturing device at the time the current image was taken, and the possibly available depth of particular pixels of the current image, the (partial) position of a current feature in world coordinates can be determined. This is then used to narrow the search space by only considering those reference features as possible matches that are located closely to the (partial) position of the current feature in world coordinates (advantageously using P). The resulting matches can for instance be used to initialize a visual camera tracking method in an Augmented Reality application.

As set out above, known methods decide based on the position of the capturing device which reference features might be visible and which are most likely not. This decision is taken on a per-image-level, meaning that the same subset of reference features is considered as a possible match for all current features in a current camera image. The approach according to the present invention differs from these approaches as it associates with the detected feature of a camera image an at least partial position and/or orientation information of the detected feature with respect to the global coordinate system, and takes this decision on a per-feature-level. The set of possibly matching reference features is determined for every detected feature in the current camera image based on its (partially) known global position.

Figure 4:
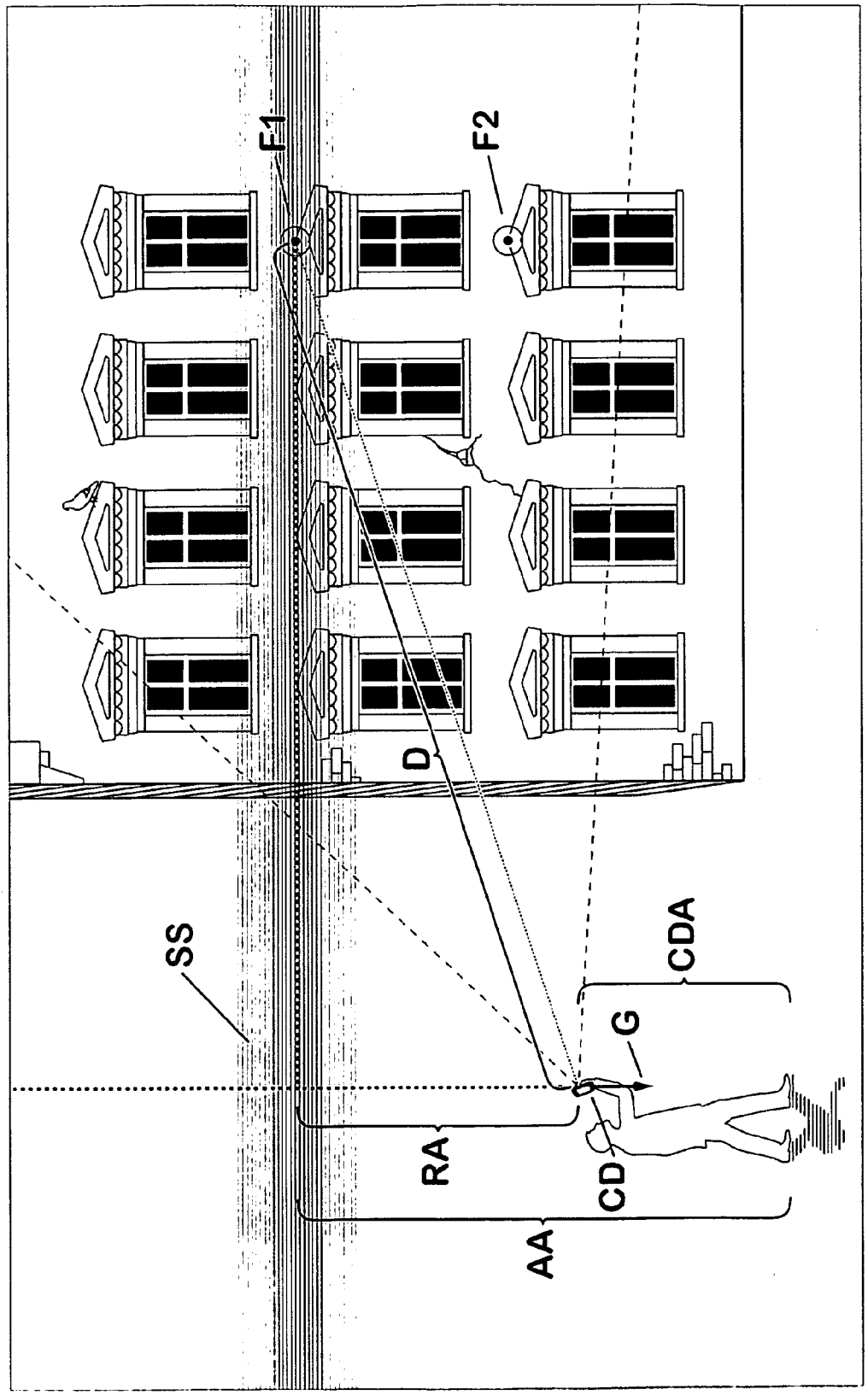
FIG. 4 shows an exemplary scene in which a method according to an embodiment of the invention is applied.

FIG. 4 illustrates a possible implementation of this aspect of the invention. Particularly, FIG. 4 shows a capturing device CD that provides a measurement of a gravity vector G in device coordinates (i.e. coordinates of the capturing device coordinate system) and the depth D of a feature F1. Given the two pieces of information, the relative altitude RA of the feature F1 with respect to the capturing device CD can be computed. Particularly, the 2D position of the feature F1 in the image together with intrinsic camera parameters enable defining a 3D ray in the coordinate system associated to the capturing device. As the depth D of the feature F1 is known, the feature's 3D position in the camera-aligned coordinate system can be computed. The vector from the optical center of the capturing device CD to the 3D feature position of feature F1 is then projected onto the normalized gravity vector resulting in the relative altitude RA of the feature F1. Adding the (absolute) altitude CDA of the capturing device CD results in the absolute altitude AA of the feature F1. Analogous calculations can be made for feature F2 to calculate its altitude.

The search space SS for a reference feature corresponding to the current feature F1 is then defined around its altitude AA. Note that in this way, the reference feature F2 is not considered as a possible match, even though it looks very similar to F1, because it does not fall into the search space SS. The search space can of course be controlled through the calculation of P in the proposed hardware engine. Thereby, the invention according to this aspect reduces the probability of mismatches.

According to one aspect of the invention, a very large set of reference features (e.g. billions or millions) is first reduced by a software approach (e.g. using GPS data as input) to a smaller set (e.g. thousands or hundred thousands), which are then matched using the hardware engine.

A well-suited data structure for this implementation in the global coordinate system domain would be a non-uniform grid that has the majority of subdivisions along the gravity axis.

In one aspect of the invention, the at least one respective threshold and the weighting depend on the uncertainty of an initial estimate of the pose of the capturing device, e.g. a camera pose. In this case, the thresholds theta ($\theta_i$) and the weights ($w_i$) depend on the propagated uncertainty of the feature position estimate, propagated based on the device's current pose estimation.

For instance, the uncertainty information is determined based on the type of sensor for providing the position, orientation and/or altitude of the capturing device.

According to an embodiment of the invention, uncertainty information for a feature is available and may be used to determine the check parameter P(c,r) and/or the similarity measure D(c,r). For example, the thresholds ($\theta_x$, $\theta_y$, ... in the above formulas) may be changed dynamically depending on the uncertainty information of a feature, and/or the parameters of the feature vector used for determining parts of the distance measure D(c, r) or parts thereof (such as $\Delta u$, $\Delta v$, $\Delta x$, $\Delta y$, $\Delta z$, $\Delta d$) are selected depending on the uncertainty information.

For example, parameters having a low uncertainty may be used to determine the first distance measure $\Delta x$ and the threshold $\theta_x$ is set to a low value. Parameters having a high uncertainty may be used to determine the second distance measure $\Delta y$ and the threshold $\theta_y$ is consequently set to a higher value. For example, the uncertainty of each of the parameters p0, p1, p2 of the 3D position information of the current feature P is available (wherein, for example, p0 corresponds to the x-coordinate in Cartesian coordinates, p1 to y, and p2 to z respectively). Suppose the height p2 is determined with little uncertainty, but the coordinate measures p0 and p1 have a high uncertainty. In this case, p2 would be part of $\Delta x$, wherein p0 and p1 are part of $\Delta y$ and $\theta_x < \theta_y$.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A method of matching image features with reference features, comprising the steps of:
    obtaining a current image captured by a capturing device;
    determining current features in the current image;
    associating, with each of the current features, at least one respective current feature descriptor;
    loading the current feature descriptors into a dedicated memory of an integrated circuit; and
    matching the current features with two or more reference features by determining a respective similarity measure between each respective current feature descriptor and each respective reference feature descriptor corresponding to a respective reference feature of the two or more reference features, comprising, for at least two of the of the two or more reference features:
        loading the reference feature descriptor corresponding to the reference feature to a unit of the integrated circuit, and
        determining, for each respective current feature descriptor, a similarity measure between the at least one feature descriptor and the reference feature descriptor,
        wherein the integrated circuit is dedicated to logical functions for determining the similarity measure.

2. The method according to claim 1, wherein the current image is one selected from a group consisting of an intensity image and a depth image.

3. The method according to claim 1, wherein determining, for each respective current feature descriptor, a similarity measure further comprises: determining a respective distance measure between one or more properties of the respective current feature including the respective current feature descriptor and one or more properties of the respective reference feature including the reference feature descriptor for the determination of the similarity measure.

4. The method according to claim 3, further comprising weighting at least one of the properties of the respective current feature and the respective reference feature, when determining the respective similarity measure between the respective current feature descriptor and the reference feature descriptor.

5. The method according to claim 3, wherein determining the respective distance measure, and the respective check parameter are performed in parallel in a pipelined manner on the integrated circuit.

6. The method according to claim 3, wherein one respective distance measure and check parameter is calculated per clock cycle of a clock signal of the integrated circuit.

7. The method according to claim 3, further comprising:
    determining from the computed distance measures a lowest distance measure; and
    storing an index of the respective current feature descriptor for which the lowest distance measure has been determined.

8. The method according to claim 1, wherein determining a similarity measure comprises calculating a check parameter to determine whether a feature pair with one of the current features and one of the reference features is eligible to be a valid match.

9. The method according to claim 8, wherein determining, for each respective current feature descriptor, a similarity measure further comprises: determining a respective first distance measure between each respective current feature descriptor and each respective reference feature descriptor for the determination of the similarity measure.

10. The method according to claim 9, wherein determining, for each respective current feature descriptor, a similarity measure further comprises: determining a respective second distance measure between position information of the respective current feature descriptor in the current image and position information of the respective reference feature descriptor in a common coordinate system.

11. The method according to claim 10, wherein determining, for each respective current feature descriptor, a similarity measure further comprises: determining a respective third distance measure indicative of an angle between position information of the respective current feature descriptor in the current image and position information of the respective reference feature descriptor in a common coordinate system.

12. The method according to claim 11, wherein determining, for each respective current feature descriptor, a similarity measure further comprises: determining a respective fourth distance measure between a scalar property of the respective current feature descriptor in the current image and a scalar property of the respective reference feature descriptor.

13. The method according to claim 12, further comprising computing sum-of-differences or sum-of-square-differences for determining the respective first distance measure over a respective dimension.

14. The method according to claim 13, further comprising determining at least one respective check parameter by comparing at least one of the respective second, third and fourth distance measures with at least one respective threshold, wherein the check parameter is used to determine whether a feature pair with one of the current features and one of the reference features is eligible to be a valid match.

15. The method according to claim 14, wherein the at least one respective threshold and the weighting depend on an uncertainty of an initial estimate of a pose of the capturing device.

16. The method according to claim 1, wherein after determining a respective similarity measure, the method further comprises storing a most similar and a second most similar similarity measure from the similarity measures determined, and an index of the respective current feature descriptor associated with the most similar similarity measure.

17. The method according to claim 16, wherein the most similar similarity measure is compared with a derivative of the second most similar similarity measure, wherein if this comparison fulfills a predetermined condition, the most similar and second most similar similarity measure, the index, and the associated reference feature descriptor is provided for further processing.

18. The method according to claim 1, wherein the integrated circuit comprises a register bank that holds a reference feature descriptor vector and two accumulator registers for holding a respective check parameter and a respective distance measure, wherein only parts of a respective current feature descriptor vectors and reference feature descriptor vector are compared at once.

19. The method according to claim 1, wherein the current feature descriptors are retrieved from the memory without wait states.

20. The method according to claim 1, wherein at least a pixel of the current image is set as a respective current feature in the current image.

21. The method according to claim 1, wherein a first set of the current features are determined utilizing a first feature extraction process, and a second set of the current features is determined utilizing a second feature extraction process, wherein the first feature extraction process and the second feature extraction process are different from each other.

22. The method according to claim 1, further comprising performing geometric verification to remove incorrect feature matches.

23. The method according to claim 1, wherein each of the reference features comprises at least one first parameter which is at least partially indicative of a position of the reference feature with respect to a global coordinate system, wherein the global coordinate system is an earth coordinate system or an object coordinate system the method further comprising:
   associating with a respective current feature at least one second parameter which is at least partially indicative of a position of the current feature with respect to the global coordinate system; and
   matching the current feature with at least one of the reference features of the set of reference features by determining the similarity measure between the at least one first parameter and the at least one second parameter.

24. The method according to claim 23, further comprising: defining a search space with a reduced number of reference features within the set of reference features when matching the respective current feature, wherein the search space is determined based on the at least one second parameter.

25. The method according to claim 1, wherein at least one of the current feature descriptor or the reference feature descriptor is invariant to scale.

26. An integrated circuit for matching of image features with reference features, comprising:
   a memory comprising a number of current feature descriptors of respective current features taken from a current image captured by a capturing device;
   a unit for receiving a number of reference feature descriptors of respective reference features; and
   a logic circuit for matching the current features with two or more reference features by determining a respective similarity measure between each respective current feature descriptor and each respective reference feature descriptor corresponding to a respective reference feature of the two or more reference features, comprising, for at least two of the of the two or more reference features:
      loading the reference feature descriptor corresponding to the reference feature to a unit of the integrated circuit, and
      determining, for each respective current feature descriptor, a respective similarity measure between each respective current feature descriptor and each respective reference feature descriptor.

27. The integrated circuit of claim 26, wherein the current image is one selected from a group consisting of an intensity image and a depth image.

28. The integrated circuit of claim 26, wherein determining, for each respective current feature descriptor, a similarity measure further comprises: determining a respective distance measure between one or more properties of the respective current feature including the respective current feature descriptor and one or more properties of the respective reference feature including the reference feature descriptor for the determination of the similarity measure.

29. The integrated circuit of claim 28, wherein determining the respective distance measure, and the respective check parameter are performed in parallel in a pipelined manner on the integrated circuit.

30. The integrated circuit of claim 28, wherein one respective distance measure and check parameter is calculated per clock cycle of a clock signal of the integrated circuit.

* * * * *